US012741886B1

(12) United States Patent
Bolorinos et al.

(10) Patent No.: US 12,741,886 B1
(45) Date of Patent: Sep. 22, 2026

(54) ENERGY SERVICES THROUGH INTEGRATED FLEXIBLE OPERATION OF WASTEWATER SYSTEMS

(71) Applicant: The Board of Trustees of the Leland Stanford Junior University, Stanford, CA (US)

(72) Inventors: Jose Bolorinos, Stanford, CA (US); Meagan Mauter, Stanford, CA (US); Ram Rajagopal, Stanford, CA (US)

(73) Assignee: The Board of Trustees of the Leland Stanford Junior University, Stanford, CA (US)

( * ) Notice: Subject to any disclaimer, the term of this patent is extended or adjusted under 35 U.S.C. 154(b) by 371 days.

(21) Appl. No.: 18/556,742

(22) PCT Filed: Apr. 29, 2022

(86) PCT No.: PCT/US2022/027073
§ 371 (c)(1),
(2) Date: Oct. 23, 2023

(87) PCT Pub. No.: WO2022/232603
PCT Pub. Date: Nov. 3, 2022

Related U.S. Application Data

(60) Provisional application No. 63/182,493, filed on Apr. 30, 2021.

(51) Int. Cl.
*C02F 1/00* (2023.01)
*G05B 13/04* (2006.01)

(52) U.S. Cl.
CPC ............ *C02F 1/008* (2013.01); *G05B 13/042* (2013.01); *C02F 2201/009* (2013.01); *C02F 2209/006* (2013.01)

(58) Field of Classification Search
None
See application file for complete search history.

(56) References Cited

U.S. PATENT DOCUMENTS 11,912,212 B2 * 2/2024 Van Beek ............... B63B 29/14
2009/0114602 A1 5/2009 Logan et al.
(Continued)

FOREIGN PATENT DOCUMENTS

EP 4330196 A1 3/2024
EP 4330196 A4 2/2025
(Continued)

OTHER PUBLICATIONS

Tuoyuan Cheng et al Forecasting of Wastewater Treatment Plant Key Features Using Deep Learning-Based Models: A Case Study, Oct. 21, 2020. All pages (Year: 2020).*
(Continued)

*Primary Examiner* — Howard Cortes
(74) *Attorney, Agent, or Firm* — KPPB LLP

(57) ABSTRACT

A method, a system, and a computer program product for managing energy at a wastewater treatment facility. One or more measurements received from one or more sensors of at least one wastewater treatment facility communicatively coupled to at least one processor are processed The processed measurements are stored in at least one storage location. Based on the processed measurements, one or more first times are determined. Operation of the wastewater treatment facility is controlled using the determined first times.

19 Claims, 8 Drawing Sheets

(56) References Cited

U.S. PATENT DOCUMENTS

2010/0200476 A1* 8/2010 Mayuzumi .............. C02F 1/048 210/97
2012/0031837 A1 2/2012 Amir et al.
2013/0066475 A1 3/2013 Yokokawa et al.
2013/0142677 A1 6/2013 Snyder
2014/0021130 A1* 1/2014 Liu ....................... C02F 3/1215 210/605
2014/0209479 A1 7/2014 Hoffmann et al.
2014/0263006 A1* 9/2014 Potts ....................... C02F 3/306 210/197
2017/0061309 A1 3/2017 Wasserkrug et al.
2017/0253511 A1 9/2017 Babinski et al.
2018/0121889 A1* 5/2018 Subbarayalu Venkitapathi ........... G06Q 50/06
2019/0127236 A1* 5/2019 Zhou ....................... C02F 1/442
2021/0070645 A1 3/2021 Ma
2021/0323850 A1* 10/2021 Kelsey ...................... C02F 9/00
2021/0395120 A1* 12/2021 Han ..................... G05B 13/041
2021/0398140 A1* 12/2021 Delahaye ............. G06Q 10/067

FOREIGN PATENT DOCUMENTS

WO WO-2021/041341 A1 3/2021
WO WO-2021/067398 A1 4/2021
WO 2022232603 A1 11/2022

OTHER PUBLICATIONS

Jorge Filipe et al. Data-driven predictive energy optimization in a wastewater pumping station, Jun. 8, 2019. All pages (Year: 2019).*

Extended European Search report received for European Application No. 22796865.8, Search completed Jan. 13, 2025, Mailed Jan. 28, 2025, 10 pgs.

International Search Report and Written Opinion for International Application No. PCT/US2022/027073, Search completed Jun. 28, 2022, Mailed Jul. 18, 2022, 14 Pgs.

International Preliminary Report on Patentability for International Application PCT/US2022/027073, Report issued Oct. 24, 2023, Mailed Nov. 9, 2023, 7 Pgs.

* cited by examiner

200
Real-time Control Engine
ADR interface
211
Forecaster
209
Facility-load model
201
Load
203
Optimizer
207
Energy storage 1
Energy storage 2
...
Energy storage k
205
Control system interface
213
IOT sensors
215
Local climate database
223
EMS
217
Facility database
221
Facility LIMS
219

320
Capacity Planning Engine
Historical digital twin component
201
Facility load model component
308
Control simulation component
306
Capacity planning component
304
302
213
Control system interface
215
IOT sensors
EMS
217
221
Facility database
219
Facility LIMS

ENERGY SERVICES THROUGH INTEGRATED FLEXIBLE OPERATION OF WASTEWATER SYSTEMS

CROSS-REFERENCE TO RELATED APPLICATIONS

This application is a national stage entry of Patent Cooperation Treaty Application No. PCT/US2022/027073 filed Apr. 29, 2022, entitled "ENERGY SERVICES THROUGH INTEGRATED FLEXIBLE OPERATION OF WASTEWATER SYSTEMS," which claims priority to U.S. Provisional Application No. 63/182,493 filed Apr. 30, 2021, entitled ENERGY SERVICES THROUGH INTEGRATED FLEXIBLE OPERATION OF WASTEWATER SYSTEMS," the disclosures of which are incorporated herein by reference in their entirety.

BACKGROUND

The energy use and recovery characteristics of wastewater treatment plants (WWTPs) make them a major source of energy flexibility that can support the grid as it transitions to a greater share of variable renewable electricity. This is because wastewater treatment creates and expends various forms of chemical, mechanical, thermal, and electrical energy that can be coordinated to provide energy services to electricity or natural gas grids.

SUMMARY

In some implementations, the current subject matter relates to a computer-implemented method for managing energy at a wastewater treatment facility. The method may include processing, using at least one processor, one or more measurements received from one or more sensors of at least one wastewater treatment facility communicatively coupled to the at least one processor, and storing the processed one or more measurements in at least one storage location, determining, using at least one processor, based on the processed one or more measurements, one or more first times, and controlling, using at least one processor, operation of at least one wastewater treatment facility using the determined one or more first times.

In some implementations, the current subject matter may include one or more of the following optional features. In some implementations, one or more sensors may monitor and measure at least one of: one or more operational parameters associated with operation of at least one wastewater treatment facility, one or more external parameters associated with an environment of the at least one wastewater treatment facility, one or more power parameters associated with a power consumption by the at least one wastewater treatment facility for operating of one or more processes of the at least one wastewater treatment facility, one or more power parameters associated with power generation by the at least one wastewater treatment facility from one or more on-site electricity generation resources, one or more parameters associated with at least one of direct and indirect energy storage by the at least one wastewater treatment facility, and any combination thereof.

In some implementations, one or more first times may include one or more times during which the at least one wastewater treatment facility is configured to at least one of: consume energy for operating of the one or more processes, produce energy for operating of the one or more processes, and directly and/or indirectly store one or more co-dependent types of energy as a result of operating of one or more operationally co-dependent processes, and any combination thereof.

In some implementations, one or more operational parameters may include at least one of the following: a flow of wastewater into the at least one wastewater treatment facility, a flow of processed wastewater between one or more unit processes of the at least one wastewater treatment facility; a flow of primary solids out of one or more primary treatment processes of the at least one wastewater facility; a flow of waste activated sludge out of one or more secondary processes of the at least one wastewater treatment facility; a flow of at least one of fats, oils and greases received by the at least one wastewater treatment facility and injected into one or more anaerobic digesters of the at least one wastewater treatment facility; a flow of food and/or organic wastes received by the at least one wastewater treatment facility and injected into one or more anaerobic digesters of the at least one wastewater treatment facility; a concentration of total and volatile solids, chemical oxygen demand, total nitrogen, and ammonia in flows of primary solids out of one or more primary treatment processes of the at least one wastewater facility; a concentration of total and volatile solids, chemical oxygen demand, total nitrogen, and ammonia in flows of waste activated sludge of one or more secondary processes of the at least one wastewater treatment facility; a concentration of total and volatile solids, chemical oxygen demand, total nitrogen, and ammonia in flows of at least one of fats, oils and greases received by the at least one wastewater treatment facility; a concentration of total and volatile solids, a chemical oxygen demand, a total nitrogen, and ammonia of a flow of food and/or organic wastes received by the at least one wastewater treatment facility; a concentration of total and volatile solids, a chemical oxygen demand, a total nitrogen, and ammonia in the one or more anaerobic digesters of the at least one wastewater treatment facility; an amount of raw wastewater stored at the at least one wastewater treatment facility; an amount of processed wastewater stored at the at least one wastewater treatment facility; a temperature associated with operating one or more processes of the at least one wastewater treatment facility; a temperature associated with operating one or more on-site co-generation units of the at least one wastewater treatment facility to generate at least one of heat and electricity; a pressure associated with operating one or more processes of the at least one wastewater treatment facility; and any combination thereof.

In some implementations, one or more external parameters may include at least one of the following: an external temperature corresponding to a temperature of air outside of the at least one wastewater treatment facility, an internal temperature corresponding a temperature of air at the at least one wastewater treatment facility, an external humidity corresponding a humidity of air outside of the at least one wastewater treatment facility, an internal humidity corresponding a humidity of air at the at least one wastewater treatment facility, an external precipitation amount corresponding to the local precipitation at a location of the at least one wastewater treatment facility, and any combination thereof.

In some implementations, one or more power consumption parameters may include at least one of the following: an amount of electricity consumed for operating one or more treatment processes and/or auxiliary processes of the at least one wastewater treatment facility, an amount of electricity consumed for operating one or more direct and/or indirect energy storage systems of the at least one wastewater treatment facility, an amount of electricity consumed to operate a heat pump of the at least one wastewater treatment facility, and any combination thereof.

In some implementations, one or more power generation parameters may include at least one of the following: a flow of biogas generated by the at least one wastewater treatment facility, a heating value of biogas generated by the at least one wastewater treatment facility, a flow of natural gas consumed by the at least one wastewater treatment facility for operation of one or more processes, an amount of electricity generated by an on-site combustion turbine and/or internal combustion engine of the at least one wastewater treatment facility, an amount of energy generated by an on-site combustion turbine and/or internal combustion engine operating for combined heat and power of the at least one wastewater treatment facility, an amount of electricity generated by an array of on-site solar photovoltaic panels of the at least one wastewater treatment facility, an amount of electricity generated by an on-site wind turbine of the at least one wastewater treatment facility, an amount of electricity generated by a microbial fuel cell of the at least one wastewater treatment facility, an amount of electricity generated by a biogas fuel cell of the at least one wastewater treatment facility, and any combination thereof.

In some implementations, one or more direct or indirect energy storage parameters may include at least one of the following: an amount of energy stored in an on-site battery of the at least one wastewater treatment facility, an amount of electric power flowing into or out of an on-site battery of the at least one wastewater treatment facility, a state of health of an on-site battery of the at least one wastewater treatment facility, a state of charge of an on-site battery of the at least one wastewater treatment facility, a volume stored in a raw wastewater storage tank of the at least one wastewater treatment facility, a volume stored in a primary effluent storage tank of the at least one wastewater treatment facility, a volume stored in a secondary effluent storage tank of the at least one wastewater treatment facility, a volume stored in a low pressure membrane biogas holder of the at least one wastewater treatment facility, a volume stored in a medium pressure biogas storage tank of the at least one wastewater treatment facility, a volume stored in liquefied biogas storage tank of the at least one wastewater treatment facility, a volume stored in an anaerobic digester's head-space and available piping volume capacity preceding a co-generation fuel inlet valve of the at least one wastewater treatment facility, a volume or pressure of oxygen stored in an oxygen tank of the at least one wastewater treatment facility, a volume of flows into and out of all of the storage tanks specified above of the at least one wastewater treatment facility, a dissolved oxygen concentration in an activated sludge basin, trickling filter, or aerobic membrane bioreactor of the at least one wastewater treatment facility, an amount of oxygen flowing into an activated sludge basin, trickling filter, or aerobic membrane bioreactor of the at least one wastewater treatment facility, a volume and a total and volatile solids concentration stored in a sludge holding tank, a volume and a total and volatile solids concentration stored in a fats oils and greases holding tank, a volume and a total and volatile solids concentration stored in a food waste tank of the at least one wastewater treatment facility, a volume and a total and volatile solids concentration stored in an organic wastes tank of the at least one wastewater treatment facility, a flow into or out of any of the biosolids holding tanks of the at least one wastewater treatment facility, and any combination thereof.

In some implementations, the determining may include training at least one model using at least one of: the one or more operational parameters, the one or more external parameters, the one or more power consumption parameters, the one or more power generation parameters, the one or more direct or indirect energy storage parameters, and any combination thereof. It may also include forecasting, using the trained model, the one or more first times during which the at least one wastewater treatment facility is configured to at least one of: consume energy for operating of the one or more processes, produce energy for operating of the one or more processes, and store energy as a result of operating of the one or more processes.

In some implementations, the determining may include determining the one or more times to reduce a power consumption by the at least one wastewater treatment facility.

In some implementations, the controlling may include executing, using the at least one processor, the one or more processes at the determined one or more times.

In some implementations, the current subject matter relates to a computer implemented method for managing energy at a wastewater facility. The method may include processing, using at least one processor, one or more measurements received from one or more sensors of at least one wastewater treatment facility communicatively coupled to the at least one processor, and storing the processed one or more measurements in at least one storage location; training, using the at least one processor, at least one model using at least one or more parameters associated with operation of one or more processes of the at least one wastewater treatment facility, the one or more processes being associated with the one or more processed measurements; determining, using the trained model, the one or more times during which the at least one wastewater treatment facility is configured to at least one of: consume energy for operating of the one or more processes, produce energy for operating of the one or more processes, and store energy as a result of operating of the one or more processes; and managing, using the at least one processor, operation of the one or more processes of at least one wastewater treatment facility based on the determining.

In some implementations, the current subject matter may include one or more of the following optional features. The managing may include upgrading operation of the one or processes of the at least one wastewater treatment facility.

In some implementations, the managing may include controlling operation of the one or processes of the at least one wastewater treatment facility.

In some implementations, the method may also include determining, using the at least one processor, one or more optimal future direct and/or indirect energy storage upgrades and one or more energy generation upgrades for implementation at the at least one wastewater treatment facility in accordance with the determined one or more times.

In some implementations, the determining of the one or more optimal future direct and/or indirect energy storage upgrades and the one or more energy generation upgrades may include selecting one or more design parameters of one or more new energy generation and storage equipment, the one or more design parameters including at least one of the following: an energy storage and/or a power capacity of a battery, a power generation capacity of a solar photovoltaic array, a power generation capacity of a wind turbine, a power generation capacity of a combined heat and power unit, a power generation capacity of a microbial battery, a power generation capacity of a biogas fuel cell, a volume of an anaerobic digester, a treatment capacity of a biogas dewatering unit, a treatment capacity of a biogas upgrading unit, a volume and type of a biogas storage tank at standard temperature and pressure, a volume of a compressed oxygen storage tank, a volume of a biosolids storage tank, a volume of a fats, oils and greases storage tank, a volume of a food waste storage tank, one or more specifications of a pump for pumping biosolids, fats, oils, and greases, and food waste into and out of the biosolids storage tank and/or fats, oils and greases and food waste storage tank, a volume and/or a material composition of wastewater storage tank, one or more specifications of a pump for pumping wastewater into and out of the wastewater storage tank, one or more specifications of a mixer for mixing wastewater stored in a wastewater storage tank, and any combination thereof.

Non-transitory computer program products (i.e., physically embodied computer program products) are also described that store instructions, which when executed by one or more data processors of one or more computing systems, causes at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including a connection over a network (e.g., the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims.

BRIEF DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations. In the drawings.

DETAILED DESCRIPTION

Industrial processes are essential for large-scale energy services that can support the growth of intermittent renewable generation. Wastewater treatment facilities are large and widespread sources of industrial demand flexibility that can support the electricity grid's renewable transition. They have strong cost incentives and may possess multiple, embedded sources of energy flexibility but their potential remains relatively untapped due to a variety of factors.

Figure 1:
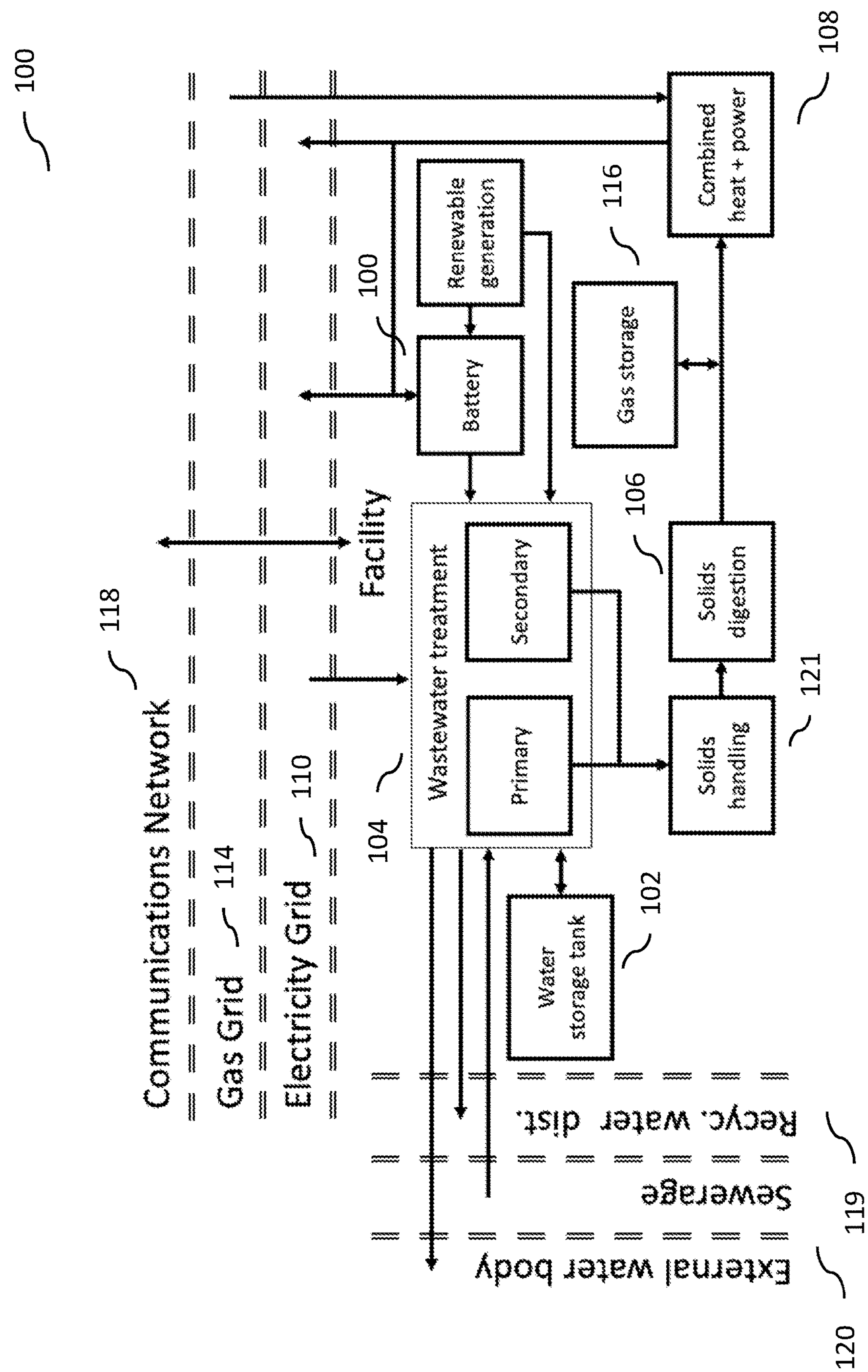
FIG. 1 illustrates various hypothetical energy sources and sinks at an exemplary wastewater treatment facility.

A unique feature of wastewater treatment facilities is the variety and co-dependence of energy flexibility sources embedded in their operations. FIG. 1 illustrates an exemplary wastewater facility 100. The facility's energy flexibility resources 100 may include wastewater water tank 102, a treatment component 104, a sludge digestion component 106, a combustion turbine 108, and a gas holder component 116. The facility 100 may also be connected to an electricity grid 110 that may supply electrical energy for treatment of wastewater, a battery 112, and a natural gas grid 114. During operation wastewater may be received at the water tank 102 and processed through the treatment component 104, where separation of wastewater into various parts, including solids, liquids, etc. may occur. The treatment component 104 may draw electricity for its operation from the electricity grid 110.

Sludge received from the treatment component 104 may be processed by the solids handling component 121 and fermented in the digestion component 106. Fermentation of processed solids 106 may generate biogas that may be stored by the gas storage component 116. Biogas from digestion of sludge may also be provided to (and/or along with gas from the natural gas grid 114) feed the combustion turbine 108, which generates heat and electricity that may be fed back to the grid 110 and/or a battery 112. The facility 100 may also be coupled to a communications network 118 that may be used to manage it using a control system interface.

In the facility 100, energy may be stored indirectly as wastewater in storage basins, and/or in other process modifications (e.g., over-aeration of activated sludge basins).

Electrical energy may be stored directly in the on-site battery 112. The natural gas pipeline network/grid 114 may provide flexibility to operate cogeneration units within regulatory natural gas blending limits.

Despite its potential, several barriers limit WWTPS' supply of energy services to electricity grids. Regulatory and institutional barriers and cybersecurity concerns limit energy market involvement. Treatment plants may lack technical expertise or capital for necessary infrastructure upgrades. Since wastewater treatment is essential, operators must balance energy flexibility with treatment performance requirements—such that risk aware planning and operation are crucial.

Another barrier is a lack of capacity planning tools that accurately model integrated operations and energy management. The sector's energy flexibility potential is well understood. Studies have examined process changes like over- or under-aeration, pump scheduling, modulated co-generation scheduling, or other changes. Wastewater treatment facility demand response field tests show load reductions of up to 50%. But conventional systems do not model the benefits of coordinated, facility-scale control of the energy flexibility sources embedded in wastewater treatment facilities, especially vis-à-vis emerging distributed energy technologies.

Further, conventional systems are not capable of planning energy flexibility upgrades at wastewater treatment facilities. Methods for valuing investments in distributed energy resources are well-established in residential and commercial settings. The challenge for wastewater treatment facilities (and other industrial facilities) is the presence of existing, embedded energy flexibility that can complement or substitute new energy storage and generation resources. Integrated, data driven industrial energy flexibility planning tools are generally rare because they require domain-specific data and knowledge about complex energy consuming processes. Existing systems exclude load flexibility from their models and/or do not use data-driven methods to simulate typical load flexibility performance.

In some implementations, the current subject matter may be configured to provide an integrated, facility-scale energy flexibility planning at wastewater treatment facilities. One of the advantages of the current subject matter may include electricity savings potential resulting from optimal operation of co-dependent energy flexibility resources, including (but not limited to): wastewater storage, low-pressure biogas storage, co-generation, and battery storage. Energy flexibility planning that is data driven may be performed on a variety of WWTP configurations, including facilities with or without biogas-fueled co-generation, facilities with or without non-potable or indirect potable reuse treatment trains, facilities with or without denitrification process, and facilities with or without phosphorus removal processes.

Experimental results from a case-study facility illustrate that energy flexibility investments are commercially viable, reducing electricity bills by 17% for an annualized investment rate of return of up to 3%. Existing sources of flexibility like wet-weather storage capacity or flexible natural gas blending can reduce electricity bills by up to 8% at minimal upfront cost.

Further, the current subject matter may be configured to provide a method for integrated energy flexibility operation at wastewater treatment facilities. The current subject matter may be configured to implement a process-based modeling and real-time, statistical digital twin system for coupled treatment and energy flexibility operation. The real-time digital twin system may be configured to process treatment facility data to explicitly learn dependencies between key sources of energy flexibility embedded in wastewater treatment processes, which may include at least one of the following: treatment flow volumes data (referring to any volumes of flows within or between individual wastewater treatment processes), electricity demand data, un-processed biosolids data, processed biosolids data, biogas production and flaring data, and/or any other data, and/or any combination thereof.

Referring back to FIG. 1, wastewater may come into a WWTP from the sewerage system and may leave as recycled water to a recycled water distribution system 119 or as effluent discharge to an external water body 120. The WWTP may receive energy from the electricity grid, the natural gas grid (as natural gas used to augment biogas fuel or for heating), or from on-site sources like combined heat and power (CIP) or renewable generation (e.g., rooftop solar photovoltaics). Energy in a WWTP may be consumed by various unit processes (e.g., aerators, mixers, etc.) at the plant to treat wastewater. WWTPs may also produce energy, most often through combustion of biogas generated from anaerobic digestion of organic matter during secondary treatment or anaerobic digestion of solids (e.g., waste activated sludge). Biogas that is produced onsite may be compressed and stored on site or combusted in a combustion turbine for CHP. WWTPs may also store natural gas onsite in compressed natural gas tanks and/or electrical energy onsite in batteries.

WWTPs may control their operations, make process modifications, and/or make infrastructure upgrades to influence when electricity is consumed or produced. For instance, a wastewater storage tank is an indirect energy storage mechanism that reduces energy consumption at the plant when it is being filled and increases energy consumption when it is emptied into the treatment train. The WWTP may also over- and/or under-aerate its aeration basin as a way of shifting or curtailing demand. In another example, the plant may modulate scheduling of flows of thickened biosolids and/or food waste to its digesters to alter the volume and strength (i.e., heat content) of the biogas it produces. These modifications may all be interdependent at the facility scale. More generally, electrical and thermal demands of any individual unit process and/or set of unit processes may be modulated to limit the electricity and/or thermal energy consumption at a given point in time.

The temporal flexibility in energy consumption, generation, and storage may provide opportunities for WWTPs to deliver energy flexibility services to the electricity and/or natural gas grids.

In some implementations, the current subject matter may be configured to automate a timing of wastewater energy storage and/or conversion to provide energy services to the electricity and or natural gas grids, including but not limited to, demand response, load following, and voltage regulation. The current subject matter system may include an application executed on at least one processor to provide the noted timing. The current subject matter system may include coordinating multiple forms of energy storage that interact with each other: electrical energy generated on site or stored in a battery, chemical energy stored as biogas, indirect energy storage as wastewater storage, and other process modifications that allow a facility to shift load from one time-period to another. Coordinated storage operation that accounts for these interactions may allow for greater energy cost savings with existing energy flexibility assets.

In some implementations, the current subject matter system may be configured to manage an electric load as a simultaneous set of coupled energy storage devices, which may require new tools to describe how modulating load for energy management affects conversion of waste in wastewater to usable forms of energy storage. Existing tools either treat electricity loads passively or may not account for a load's direct or indirect energy storage capabilities.

In some implementations, the current subject matter system may be configured to manage acquisition of natural gas blended with digester biogas to augment CHP fuel, a process not currently optimized by existing WWTP operators.

In some implementations, the current subject matter system may be configured to integrate local weather data into plant energy management to forecast and plan for wet weather events in real-time, a capability that does not currently exist at WWTPs In some implementations, the current subject matter system may be further configured to optimize scheduling of digester feeding with fats, oils, greases, and other food wastes to limit electricity costs, a capability that does not exist (nor is envisioned) at WWTPs.

In some implementations, the current subject matter system may be configured to coordinate plant operations with on-site renewable generation like solar photovoltaics or wind turbines.

In some implementations, the current subject matter system may be configured to include providing an application (e.g., an "app") that coordinates the timing of energy storage and release from relevant sources and sinks at a wastewater treatment facility. The application may be hosted on the cloud or can be local to a facility. Its coordination may be used to manage one or more of the following: electricity bills, natural gas bills, delivery of electricity or natural gas grid services, minimization of facility greenhouse gas (GHG) emissions, and minimization of noncompliance with wastewater effluent discharge requirements.

As a non-limiting example of an implementation of the current subject matter, consider a wastewater treatment facility that uses anaerobic digestion and on-site CHP to recover energy from its biosolids. The facility also has water storage equivalent to one day of its average treatment flows, and 1 MWh-equivalent of compressed gas storage. The application's forecaster uses data from the facility's control system interface and from a local weather station to predict the volume of wastewater that will enter the facility for the next 36 hours. Every 15 minutes, these predictions are generated and sent to the facility load model and the optimizer, which uses the facility load model to determine how scheduling of wastewater flows into and out of its storage tank will affect biogas production and energy demand within the forecasting horizon. The optimizer selects the optimal water storage filling/emptying schedule, determines the amount of biogas to combust in the CHP every 15 minutes, and executes the first 15-minute command through the facility's control system. The process is repeated 15 minutes later and the first 15-minute scheduling command is executed once more.

Figure 2:
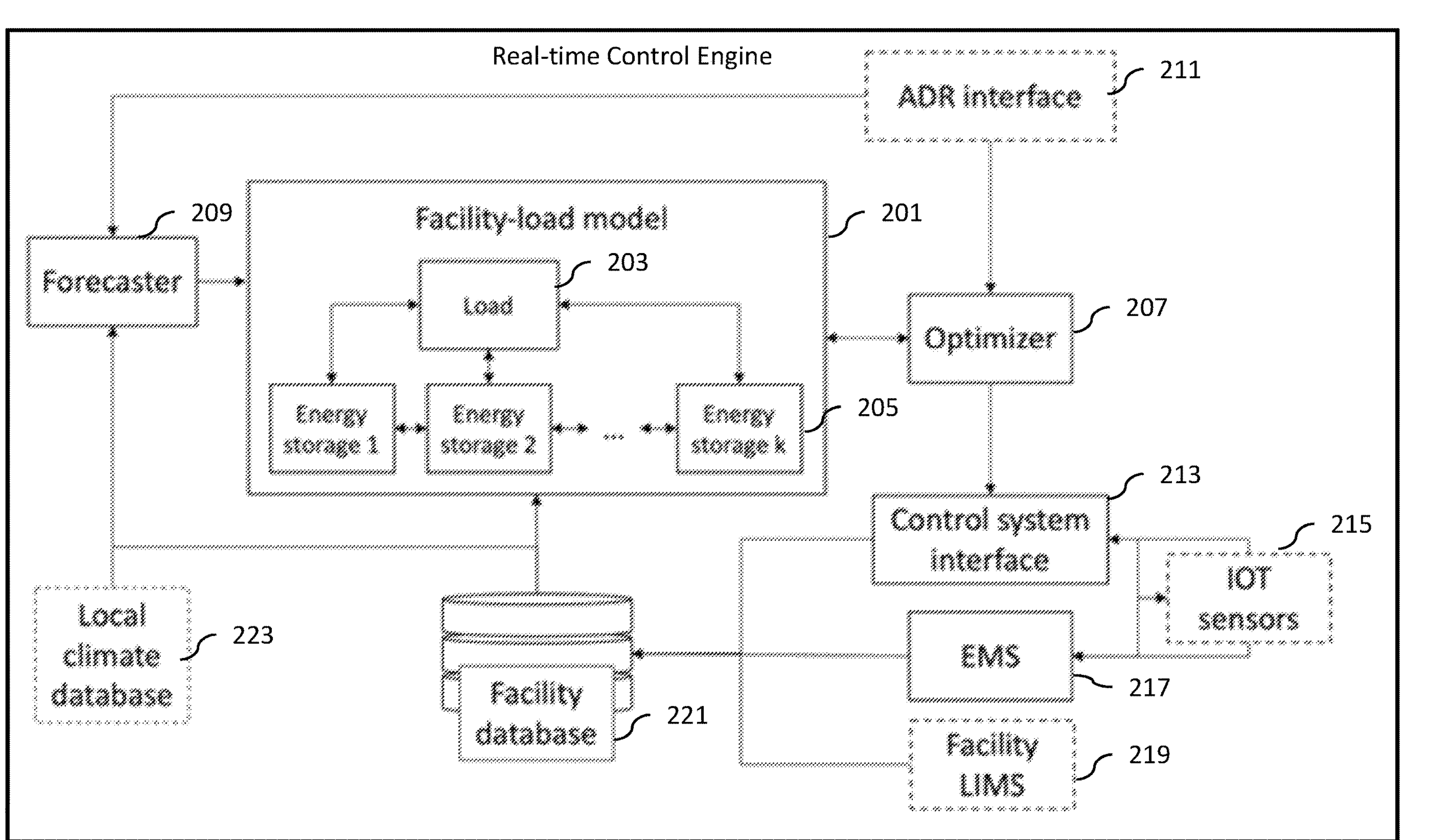
FIG. 2 illustrates an exemplary control system for managing energy flexibility resources at a facility, according to some implementations of the current subject matter.

FIG. 2 illustrates an exemplary control system 200 for managing resources at a facility, according to some implementations of the current subject matter. The system 200 may be implemented in a way that integrates any of the components of the facility shown in FIG. 1 (and/or other flexibility resources not shown in FIG. 1, such as, for example, but not limited to, food waste storage, oxygen storage, indirect energy storage through over- or under-aeration, etc.). The system 200 may include a facility load model component 201, an optimizer component 207, a forecaster component 209, a control system interface 213, an energy management system (EMS) 217, and a facility database 221. The system 200 may also include some of the optional and/or additional components, such as, for example, an automated demand response (ADR) interface 211, one or more sensors 215 (e.g., Internet-of-Things (IoT) sensors), and/or a facility laboratory information management system (LIMS) 219, as well as any other components. The system 200 may also be communicatively coupled to one or more local climate databases 223. The facility load model component 210 may include a load component 203 and one or more energy storage components 1, 2, . . . k 205.

In some exemplary, non-limiting implementations, the system 200 may be configured to operate as follows. The sensors 215 may be configured to obtain various data, including data from the facility's control system interface 213, which may, in turn, transmit the data to the facility database 221. The sensors 215 may include at least one of the following: one or more flow meters for measuring wastewater, one or more total solids (TS) analyzers for measuring the concentration of sludge at various locations in the treatment train, one or more flowmeters for measuring the volume of sludge flows through the treatment train, one or more flowmeters for measuring the volume of biogas flows out of digester(s), one or more flowmeters for measuring the volume of biogas flows through gas upgrading processes like dewatering and siloxane removal, one or more power meters for measuring power consumption by the facility's unit processes and production by its on-site electricity generation units, one or more temperature and/or pressure gauges for measuring local weather conditions, and/or any other sensors.

The facility's database 221 may be configured to receive and store data from at least one or more of the following: the LIMS 219, the EMS 217 that may be configured to operate its distributed energy resources (e.g., solar PV, battery storage, tank levels, etc.), local climate database(s) 223. The data stored in the database 221 may be configured to stream data to the forecaster component 209 and the facility load model component 201. The system 200 may be configured to use the data stored in the database 221 to train and/or re-train facility load model component 201 and the forecaster component 209. Such training/re-training may be performed periodically (e.g., every 5 days) and/or on a predetermined schedule and may be used to obtain predictions for every predetermined period of time (e.g., 1-60 minutes). The forecaster component 209 may be configured to use at least one of the following: a facility data obtained from one or more sensors 215, weather data obtained from the database 223, and/or data from the automated demand response (ADR) interface 211—in real-time (e.g., every 1-60 minutes), and/or any other data to predict influent flowrates and/or electricity prices and/or grid service compensation rates on a short time horizon (e.g., 36-48 hours ahead).

The facility load model component 201 may be configured to represent structural dependencies between wastewater influent and treatment flows, energy demand, energy recovery (e.g., biogas production), and/or energy storage. The forecaster component 209 and facility load model component 201 may be configured to use physics-based approaches, simulation-based approaches, machine-learning approaches, and/or any combinations of these to assess facility behavior.

An output from the facility load model component 201 may be configured to be used by the optimizer component 207. The optimizer 207 may be configured to select the timing of energy charges and discharges to optimize energy costs, as will be discussed in further detail below. The optimizer component 207 may use the information from the facility load model component 201 to estimate how certain decisions (e.g., diversion of influent wastewater into the storage tank) affect other relevant parameters (e.g., plant energy demand and biogas production). The optimizer component 207 may also receive input from the automated demand response (ADR) interface 211 to allow it to simultaneously determine time energy charges and discharges to optimally manage provision of grid services (e.g., load shedding, load shifting, load following, frequency regulation). Further, the optimizer 207 may have objective functions (as discussed below) that may prioritize any and/or all of cost savings, revenue from grid services, and greenhouse gas emissions reductions, discharge water quality standards, etc. An output of the optimizer 207 may be transmitted to the facility's control system 213 and/or EMS 217 for execution (which may operate on-site equipment like batteries, gas storage tanks, wastewater storage tanks, and/or renewable generation).

Figure 3:
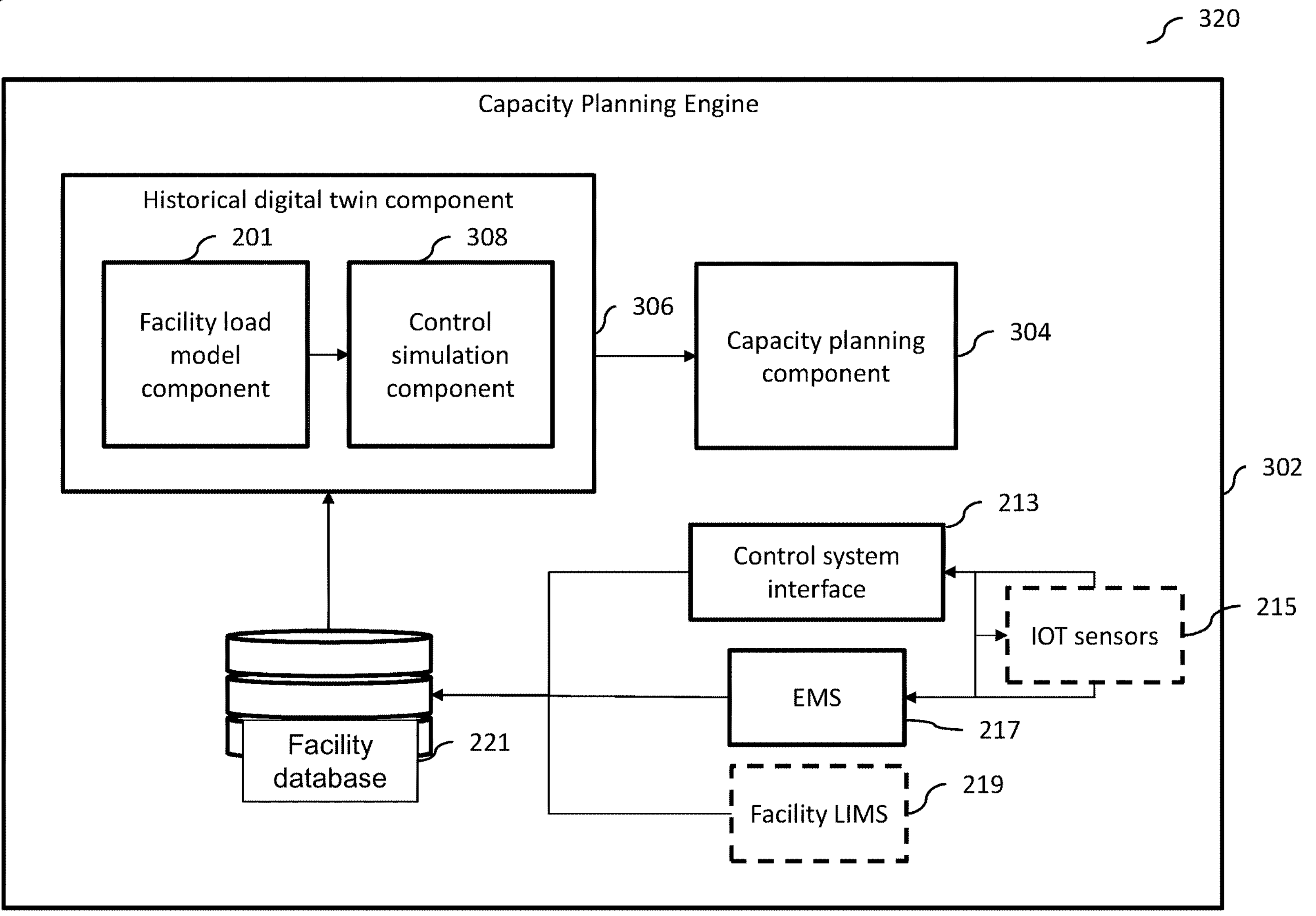
FIG. 3 illustrates an exemplary integrated energy flexibility design planning system, according to some implementations of the current subject matter.

FIG. 3 illustrates an exemplary integrated energy flexibility planning system 320, according to some implementations of the current subject matter. The system 320 may be configured to be implemented at a WWTP and/or any other energy consumption facility ("facility" and/or "treatment facility" and/or "plant") for the purposes of optimizing energy consumption at such a facility. For exemplary, non-limiting, illustrative, purposes only, the description herein is presented in connection with optimizing performance of a wastewater treatment facility. The system 320 may be configured to be implemented in the optimizer 207 and/or any other component shown in FIG. 2.

As shown in FIG. 3, the system 320 may include a capacity planning engine 302, which may, in turn, include a capacity planning component 304, a historical digital twin component 306 that may include a facility load model component 201 (as is also shown in FIG. 2) and a control simulation component 308. The capacity planning engine 302 may also include and/or may be communicatively coupled to some of the components of the system 200 shown in FIG. 2, such as for example, control system interface 213, one or more sensors 215, the EMS 217, the facility LIMS 219, and/or the facility database 221. In some exemplary implementations, a component may refer to a hardware and/or a piece of software code that may be configured to perform a particular function, a piece and/or a set of data, and/or configuration data used to create, modify, etc. one or more software functionalities. Further, the system 320 may include one or more artificial intelligence and/or learning capabilities that may rely on and/or use various data, e.g., data related to and/or operation of a wastewater treatment facility.

The elements of the system 320 (as well as system 200 shown in FIG. 2) may be communicatively coupled using one or more communications networks. The communications networks can include at least one of the following: a wired network, a wireless network, a metropolitan area network ("MAN"), a local area network ("LAN"), a wide area network ("WAN"), a virtual local area network ("VLAN"), an internet, an extranet, an intranet, and/or any other type of network and/or any combination thereof.

The elements of the system 320 (as well as system 200 shown in FIG. 2) may include any combination of hardware and/or software. In some implementations, the elements may be disposed on one or more computing devices, such as, server(s), database(s), personal computer(s), laptop(s), cellular telephone(s), smartphone(s), tablet computer(s), and/or any other computing devices and/or any combination thereof. In some implementations, the elements may be disposed on a single computing device and/or can be part of a single communications network. Alternatively, the elements may be separately located from one another.

Figure 4:
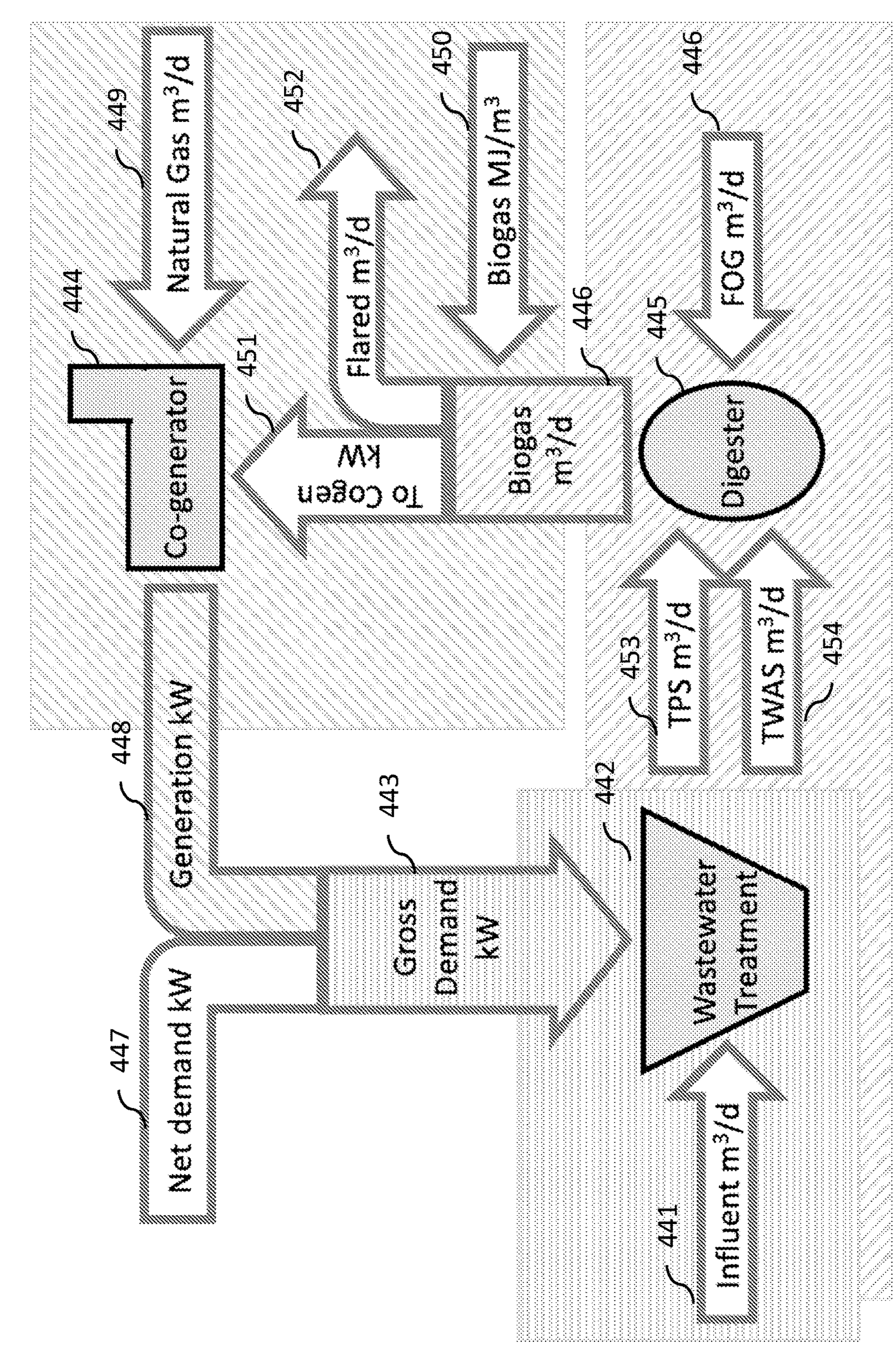
FIG. 4 illustrates an exemplary structure of modeling processes associated with the digital twin component (shown in FIG. 3), according to some implementations of the current subject matter.

FIG. 4 illustrates an exemplary operation of various processes 440 associated with the facility load model component (shown in FIG. 2) and the historical digital twin component 306 (shown in FIG. 3), according to some implementations of the current subject matter. The processes 440 may be implemented in connection with one or more wastewater components 442, one or more co-generators 444, and one or more digesters 445, which may be disposed at the wastewater treatment facility (e.g., as shown in FIG. 1).

The digital twin model of the historical digital twin component 306 may receive an influent data (e.g., wastewater, measured in $m^3/d$) 441 and gross power demand 443 (in kW). Gross power demand may be modeled as a function of influent flows and may be decomposed into a net power demand 447 (in kW) and gross power generation 448 (in kW). Gross power generation may be a function of a biogas supplied to the CHP 451, biogas heat content measured from the facility LIMS 450, and natural gas purchased from the natural gas grid 449. Biogas supplied to the CHP 451 may be derived from a total biogas and/or biogas flared 452. The total biogas may be a function of a volume of biosolids from processing of wastewater by the treatment component 442, including thickened waste activated sludge (TWAS) 454 and/or thickened primary solids (TPS) 453 (both in $m^3/d$), and the volume of fats oils and greases (FOG) 446 processed by the facility.

Figure 5:
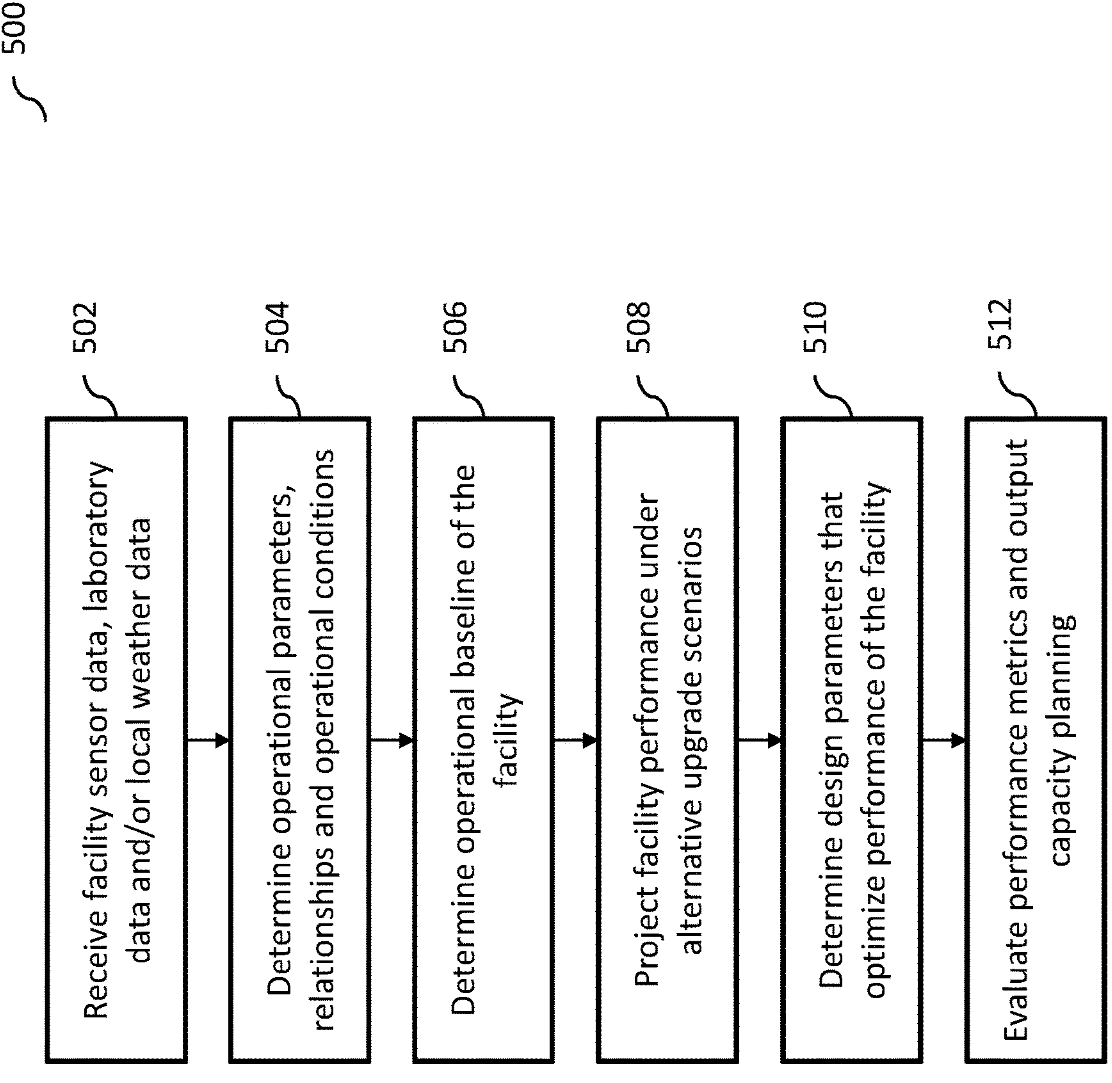
FIG. 5 illustrates an exemplary process for executing energy flexibility design planning using the digital twin component shown in FIG. 3, according to some implementations of the current subject matter.

Referring back to FIG. 3, the system 320, and in particular the engine 302, may be configured to execute a method for energy flexibility and generation capacity planning at a wastewater treatment facility. FIG. 5 illustrates an exemplary process 500 for executing energy flexibility and generation capacity planning, according to some implementations of the current subject matter. One of the results and/or advantages of the process 500 is that it may be used by the system 320 to determine one or more wastewater treatment facility design parameters to maximize expected benefits relative to facility's operational baseline.

Referring to FIGS. 2-5, the capacity planning component 304 and the process model component 201 may be used to receive facility data, at 302. The data may include facility sensor data (e.g., from one or more sensors 215, and/or other components), historical sensor data, laboratory data, and/or local weather data. At 504, statistical learning and process-based modeling may be executed to determine one or more operational parameters and/or operational parameters relationships, and one or more operational conditions associated with the wastewater treatment facility. The operations 502-504 may be performed sequentially and/or simultaneously by the engine 302 shown in FIG. 3.

At 506, the above learned relationships (at 504) may be input into the control simulation component 308 of the historical digital twin component 306, to generate and/or determine a numerical representation of the facility's operational baseline. These interrelationships may also be used, at 508, in a control optimization that projects performance with one or more flexibility upgrades. In some exemplary implementations, the processes, which may be performed at 508, may be repeated many times to determine an expectation of performance improvements.

At 510, the process 500 may (e.g., using the capacity planning component 304) proceed to analyze these improvements and determine and select one or more design parameters that may optimize performance of the facility and/or its monetary value (e.g., energy savings, consumption, etc.). At 512, the capacity planning component 304 may execute an analysis of key model parameters to evaluate how they are affected by design and modeling assumptions. Further, at 512, the engine 302 may be configured to output one or more results of the process 500 and/or display it on a user interface of a user device (not shown in FIG. 3). The following is a discussion of details of each of the operations 502-512 shown in FIG. 5. This discussion is presented in connection with a particular exemplary, non-limiting, experimental implementation and is provided for illustrative purposes only. As can be understood, other implementations of the current subject matter are possible.

In some implementations, to perform statistical learning, one or more facility operational data may be provided to and/or queried by the engine 302. The data may be stored in one or more databases and/or any other memory locations. The data may be obtained from one or more ambient air and/or water sensors (e.g., temperature, flow, pressure, humidity, etc.), meters (e.g., flow meters, electrical meters, gas meters, etc.), water quality sensors (e.g. dissolved oxygen probes, TS analyzers, total nitrogen analyzers), and/or any other data gathering devices. For example, facility's metering data may be provided and may include at least one of the following: net electricity demand, electricity generation from the co-generation units, wastewater influent flows, biogas production flows, one or more flows of thickened primary solids production, a thickened waste activated sludge production, a food waste—to the digesters, one or more amounts, prices, etc. of pipeline natural gas purchased, and/or any other data. The data may be received and/or queried on a periodic basis (e.g., at 15-minute intervals, etc.) and/or for a particular period of time (e.g., a week, a month, etc.). For example, electrical utilities typically compute maximum power demand over 15-minute periods when assessing demand charges, which may, for instance, be helpful for energy management setting. Once the data (e.g., input data values) is received by the engine 302, it may configured to convert such data (e.g., from daily totalized amounts) and preprocess it to remove repeat entries, negative values and/or any outliers.

Table 1 below illustrates data and data preprocessing and cleaning that have been processed during an exemplary experimental implementation of the current subject matter. As shown in Table 1, for instance, the operational data are queried at 15-minute intervals from a facility's data historical database ("historian"). The only exception to this is the heat content of biogas produced by the facility's three digesters, which is measured intermittently in laboratory tests. As shown in Table 1, influent flow data record volume of wastewater entering the facility from the sewage collection system. Data also include gross electricity generation from each of the facility's two 633 kW internal combustion generators and electricity purchased by the facility from its electric utility. To model biogas production, biosolids production data are also collected. These include flows of thickened primary solids, thickened waste activated sludge, and fats, oils, greases, and food waste to the facility's digesters. Thickened primary solids and waste activated sludge data are measured after solids processing and dewatering, representing flows directly into the digesters. Data on biogas flows into each of the facility's two cogeneration units and two flaring burners are also collected. These flow meters may be located downstream of the facility's biogas upgrading unit processes (e.g., dewatering, sulphate removal, siloxane removal, etc.) and thus, provide more reliable flow readings than those located directly downstream of the two digesters. Biogas combusted and flared in all generation and flaring units respectively may be aggregated to obtain a single biogas production value for the facility. Lastly, data related to flows of natural gas purchased from gas pipeline network and blended with produced biogas prior to combustion in each cogeneration unit may also be collected.

Operational data may be preprocessed and cleaned prior to analysis. This cleaning may include removal of outliers, conversion of cumulative daily amounts to amounts specific to regular time-intervals (e.g., 5 minutes), and imputation of missing values. All variables may be converted to predetermined units of measurement (e.g., metric, etc.) with flow rates provided in per-time-period (e.g., day, etc.) amounts. Reformatted variables may then be cleaned by removing negative values (e.g., all flowrates and consumption amounts may, by assumption, be positive). Outliers may be identified using conventional processes, such as, for example, but not limited to Tukey's fence method, which determines an interquartile range (IQR) from the data: $IQR=q_{75}-q_{25}$ and removes values larger than $q_{75}+1.5IQR$ or smaller than $q_{25}-1.5IQR$. In addition to preprocessing and cleaning, data from individual system components (e.g., anaerobic digesters) may be aggregated for better estimation of underlying relationships.

TABLE 1

Description of exemplary, non-limiting operational variables.

| Variable name | Variable description | Source | Query interval |
|---|---|---|---|
| Influent flow | Rate of flow entering facility from sewage collection system | Historian | 15-minute |
| Co-generator 1 gross generation | Total electricity generation from co-generator 1 | Historian | 15-minute |
| Co-generator 2 gross generation | Total electricity generation from co-generator 2 | Historian | 15-minute |
| Net power demand | Electricity purchased by the facility | Historian | 15-minute |
| Thickened primary solids to digester | Rate of flow of thickened primary solids to digesters | Historian | 15-minute |
| Thickened waste activated sludge to digester | Rate of flow of thickened waste activated sludge to digesters | Historian | 15-minute |
| Food waste to digester | Rate of flow of fats, oils and grease from food waste to digesters | Historian | 15-minute |
| Biogas to co-generator 1 | Rate of flow of upgraded biogas to co-generator 1 | Historian | 15-minute |
| Biogas to co-generator 2 | Rate of flow of upgraded biogas to co-generator 2 | Historian | 15-minute |
| Biogas to burner 1 | Biogas flared at burner 1 | Historian | 15-minute |
| Biogas to burner 2 | Biogas flared at burner 2 | Historian | 15-minute |
| Biogas heat content | Measured lower heating value of biogas produced by digester | Laboratory | daily (intermittent) |
| Natural gas to co-generator 1 | Rate of flow of pipeline natural gas blended with biogas combusted in co-generator 1 | Historian | 15-minute |

TABLE 1-continued

| Description of exemplary, non-limiting operational variables. | | | |
|---|---|---|---|
| Variable name | Variable description | Source | Query interval |
| Natural gas to co-generator 2 | Rate of flow of pipeline natural gas blended with biogas combusted in co-generator 2 | Historian | 15-minute |

Referring back to FIGS. 2-5, the engine 302 may be configured to execute one or more models (e.g., regularized linear models or multi variable adaptive regression splines) to determine one or more relationships between key operational parameters in a wastewater treatment process, which may include one or more of the following: treatment flow(s), energy use, biogas production, and/or any other parameters, and/or any combination thereof. To do this, the engine 302 may randomly assign segments (e.g., quarterly, etc.) of historical data into one or more training and/or test periods. The engine 302 may train one or more models using one or more training periods. One or more test periods may be used to select one or more hyperparameters and assess out-of-sample predictive performance. Where relevant, modeled relationships may also be included in the control simulation as constraints (as discussed below). If using linear models, relationships may be represented as follows:

$$y_t = \alpha_t + \sum_i \sum_{j=0}^{J} \beta_{ij} x_{i,t-j} + \sum_{k=1}^{K} \phi_k y_{i,t-k} + \epsilon_t \tag{1}$$

where $y_t$ is the variable being modeled at timestep t, $\alpha_t$ are learned, time-fixed effects, e.g., hour-of-day, day-of-week, quarter, etc. and $x_{i,t}$ are time-varying metering covariates. These models may account for both current and lagged dependence of $y_t$ on $x_{i,t}$ (e.g., captured by the learned parameters $\beta_{ij}$) and include auto-regressive terms that account for serial correlation in unexplained variance in $y_t$ (e.g., captured by learned parameters $\phi_k$); $\in_t$ is an uncorrelated noise term.

The engine 302 may use regularization to determine sparser representations that are more predictive of the parameters of interests. All regularization parameters and model hyperparameters (e.g., regularization method, number of model lag terms, number of autocorrelation terms, inclusion of time-specific dummy variables, etc.) may be selected using out-of-sample validation (e.g., k-fold cross-validation).

As stated above the engine 302 may implement one or more regularized linear models to represent a structural dependence of power demand and biogas production on treatment volumes and time-specific variables (e.g., hour of day, day of week, quarter of year, etc.). These structural dependencies may then be used to project facility behavior when treatment flows are modulated (e.g., due to operation of water storage, etc.). Table 2 summarizes exemplary, experimental model structures (e.g., power demand model, biogas production model, etc.) that may be used by the engine 302. Operational parameters (e.g., power demand, biogas production, etc.) may be learned using one or more predetermined time intervals (e.g., 15-minute timescales). The power demand model may include treatment flow rates and time-fixed effects (i.e., hour of day, day of week, quarter of year) and autoregressive terms (i.e., lagged power demand) as predictors.

For biogas production model, biogas production may be modeled as a function of time-specific dummy variables, 15-minute flows of thickened waste activated sludge (TWAS), thickened primary solids (TPS), and fats oils, greases, or food waste (FOG) to the digesters. Diurnal fluctuations in certain thickened solids flowrates may be smoothed with a 24-hour moving average. The biogas production model may also include autocorrelation terms to account for inertia in biogas production (i.e., the variety of unobserved factors that persistently affect a digester's production rate).

TABLE 2

| Experimental model structures used to simulate learned operational parameters in the historical digital twin of the treatment facility. | | | | |
|---|---|---|---|---|
| Operational Parameter | Regularization method | Auto-regressive terms ($\phi_k$) | Fixed effects ($\alpha_t$) | Metering Predictors ($x_{i,t}$) |
| Gross power demand | LASSO | Yes | hour, weekday, quarter | treatment flow rate |
| Biogas production | Elastic Net | Yes | hour, weekday, quarter | TPS, TWAS, FOG flow to digesters |

The engine 302 may be configured to execute a hyperparameter search to determine an optimal model structures from Table 2. Table 3 below summarizes exemplary, experimental results of the hyperparameter search executed by the engine 302. As stated herein, regularization may be used to determine sparser representations of Equation (1) above. The hyperparameter search may also include testing of various regularization methods. One example is the least absolute shrinkage and selection operator (LASSO) from which may be represented (using Equation (2) above) by:

$$\sum (y_t - \hat{y}_t)^2 + \lambda_1 \left( \sum |\alpha_t| + \sum_i \sum_{j=0}^{J} |\beta_{ij}| + \sum_{k=1}^{K} |\phi_k| \right) \tag{2}$$

where $y_t - \hat{y}_t$ is the model error and $\lambda_1$ is an L−1 penalty.

A second example is an elastic net which is similar to the LASSO but includes an additional L−2 penalty term $\lambda_2$ in its minimization:

$$\sum (y_t - \hat{y}_t)^2 + \lambda_1 \left( \sum |\alpha_t| + \sum_i \sum_{j=0}^{J} |\beta_{ij}| + \sum_{k=1}^{K} |\phi_k| \right) + \lambda_2 \left( \sum \alpha_t^2 + \sum_i \sum_{j=0}^{J} \beta_{ij}^2 + \sum_{k=1}^{K} \phi_k^2 \right) \tag{3}$$

The regularization methods in Equations (4) and (5) may be experimentally tested using 15-minute lag orders ranging from 1 (15-minutes) to 192 (48 hours) and 15-minute auto-regression orders ranging from 1 (15-minutes) to 192

(28 hours). If the regularization method is an elastic net, various L−1 to L−2 penalty ratios (Λ) of 0.1 to 0.9 may also be tested.

$$\Lambda = \frac{\lambda_2}{\lambda_1 + \lambda_2} \quad (4)$$

$$RSE = \frac{\sum (y_i - \hat{y}_i)^2}{\sum (y_i - \bar{y})^2} \quad (5)$$

Referring back to FIGS. 2-5, the engine 302, and in particular the digital twin component 306 and the facility load model component 201, may be configured to combine the above statistical learning with a process-based understanding of treatment facility's dynamics. The digital twin component 306 and the facility load model component 201 may be configured to represent a variation in a facility's historical operation and to use predictive modeling to generate counterfactual facility operation under altered treatment and energy recovery scenarios (e.g., those selected by a runtime control system optimizing the use of energy flexibility assets). The digital twin component 306 may be configured to sample one or more periods of time (e.g., months, etc.) from the facility's historical data. The digital twin component 306 and the facility load model component 201 may execute modeling processes (as discussed above) to determine model predictions and/or errors for power demand, biogas production, etc. The runtime control simulation (e.g., as may be executed by the capacity planning component 304) may use these predictions and/or errors to approximate facility operation under alternative treatment flow regimes (as discussed below). Electricity generation may then be determined from fuel inputs (e.g., as available biogas and natural gas blending) and measured generator electrical efficiency.

In some exemplary, experimental implementations, the digital twin component 306 may be configured to simulate typical facility operation by sampling calendar months from its historical data. As part of this process, missing data that results from faulty (e.g., negative or outlying) and/or missing meter readings may be imputed. Imputation of missing values may use a variety of methods, including (but not limited to) linear interpolation, cubic splines, and model-based imputation.

In some implementations, the digital twin component 306 and the facility load model component 201 may be configured to combine statistical learning and process-based concepts to generate a treatment facility's counterfactual operation under alternative treatment and biogas flow regimes. The digital twin component 306 and the facility load model component 201 may be configured to make one or more assumptions about facility's operations. For example, the heat content of produced biogas (i.e., energy available per $m^3$ of gas) may be an average of laboratory analyses of biogas lower heating value (LHV) during a predetermined period of time or may be a function of biosolids, food waste, fats, oils, and greases, or other solid streams fed to the facility's digesters (as discussed below). Second, the efficiency of both co-generators may be the same and assumed to not vary with the power generation level or may be a time-dependent function of the power generation level (as discussed below).

Figure 6:
FIG. 6 illustrates an exemplary process for controlling a facility's energy flexibility assets in real-time using the digital twin component shown in FIG. 2, according to some implementations of the current subject matter.
Figure 6:
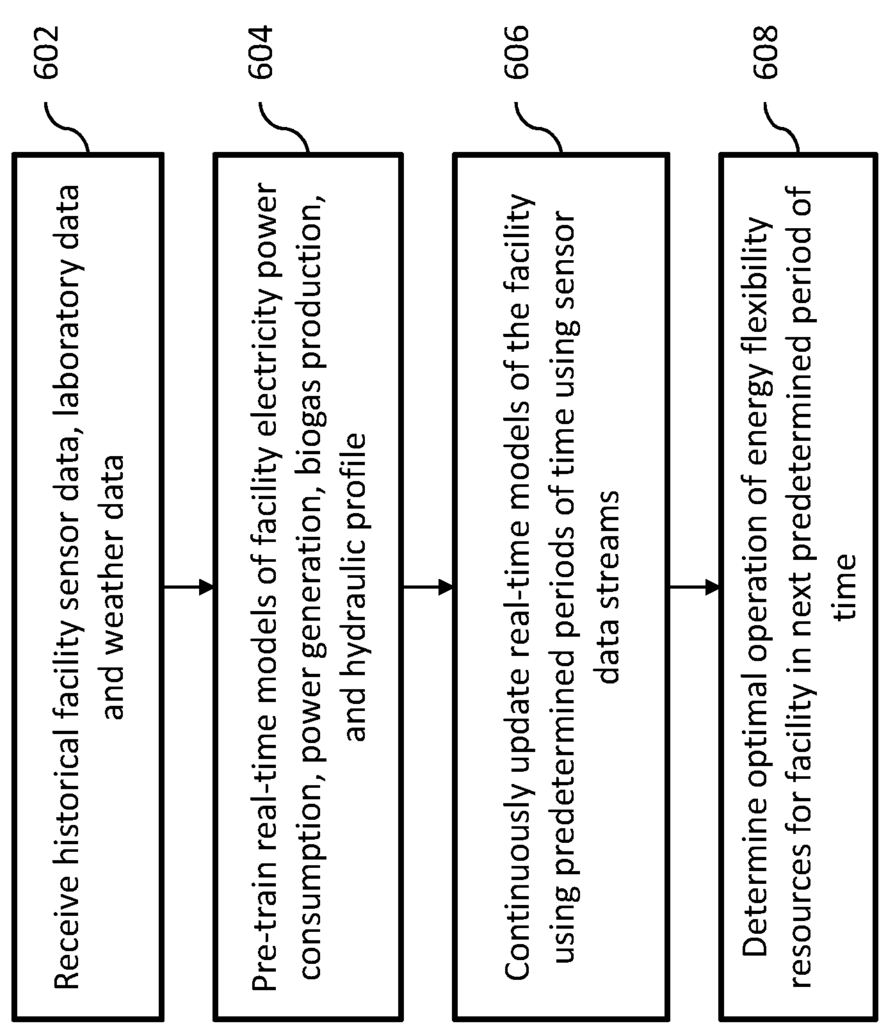

FIG. 6 illustrates an exemplary process 600 for operation of the real-time control engine 200, according to some implementations of the current subject matter. The process 600 may be executed as part of a runtime control tool, such as the one discussed in connection with FIG. 2. At 602, the facility load mode component 201 (as shown in FIG. 2) may be configured to receive various data associated with the facility, such as, for example, facility sensor data (e.g., historical data), laboratory data, and/or weather data. The data may be received using one or more components shown in FIG. 2. At 604, the component 201 may be configured to pre-train one or more real-time models of the facility that may be associated with one or more of electricity power consumption, power generation, biogas production, hydraulic profile, and/or any other models. During training, the component 201 may be configured to uniformly sample one or more predetermined periods of time (e.g., one or more calendar months). At 606, the component 201 may be configured to continuously update the real-time models of the facility (e.g., as related to electricity power consumption, power generation, biogas production, hydraulic profile, etc.) using one or more predetermined periods of time (e.g., on 1-60 minute intervals) using sensor data streams that may be received from one or more sensors (e.g., sensors 215) of the facility.

At 608, the component 207 may determine optimal operation of the energy flexibility resources for the facility in the next predetermined period of time (e.g., next 1-60 minute interval). This determination may be executed for the next predetermined period of time by sending commands to the facility's energy and wastewater storage units.

Referring back to FIG. 3, the component 302 may estimate electricity co-generation potential from available biogas and/or natural gas purchases and infer which co-generators are operational. The facility's co-generators may undergo routine maintenance and/or may experience short-term outages (e.g., lasting anywhere from 15 minutes to days). In some exemplary implementations, representing these events in the component 302 may be important as they may lead to spikes and/or prolonged increases in the net electricity demand—both of which may be relevant to estimating one or more benefits of energy flexibility. The component 302 may infer the operational status of each unit with an outage indicator flagging generation levels below 10% of capacity. Generation capacity may be set to zero for time periods with the outage indicator and 633 kW otherwise. These capacity limits may be reflected as inequality constraints in the runtime control simulation 308.

Assuming a co-generator unit i is operational, its electricity generation potential ($e_i$) may be determined using Equation (6) using measured average efficiency across both generators ($\eta$), measured biogas heat content ($h_g$) and volumes of biogas ($g_i$) and natural gas ($n_i$) combusted:

$$e_i = \frac{\eta}{3.6 \times 24}(g_i h_g + n_i h_n) \quad (6)$$

Referring back to FIGS. 2-6, the capacity planning engine 302 may be configured to execute one or more control simulations (e.g., using component 308) to estimate benefits of energy flexibility assets and the real-time control engine 200 may be configured to execute one or more processes to determine optimal energy flexibility operation in real-time. Both of these processes may include an optimization process (e.g., a linear program, a mixed integer linear program, a non-linear program, a reinforcement learning agent, or some other process) that may select optimal energy storage operation schedules from a predetermined number of available energy flexibility mechanisms (this process is shown explicitly as component 207 in FIG. 2). During both the control simulation, and in the real-time control system, one or more of several energy storage mechanisms may be analyzed and/or operated, including but not limited to: battery storage, biogas storage, wastewater storage, flexible natural gas purchases, compressed oxygen storage, etc.

In some implementations, the objective of component 308 and/or component 207 may be to limit energy costs, which may include time-of-use energy and demand charges that incentivizes load shifting away from peak demand hours. For a whole billing period (e.g., a calendar month, etc.), energy costs may include customer charges $c_C$, demand charge costs $c_D$ and a sum of energy charges, $c_{E,t}$, natural gas charges, $c_{N,t}$, and a carbon price $c_{co_2}$ (as shown by Equation (7) below):

$$c = c_C + c_D + \sum_{t=1}^{T} (c_{E,t} + c_{N,t}) + c_{co_2} \quad (7)$$

Customer charges in Equation (8) below may correspond to the product of a daily rate pc and the number of days in a billing period ($D_{bill}$). Demand charge costs may be determined using Equation (9) as the sum of the maximum net power demand $d_t$ within each of a utility's k time-of-use periods ($\tau_k$), assessed monthly over 15-minute timescales. For example, a utility may have a global demand charge—assessed over all 15-minute demand averages in a billing period—and a peak-period demand charge, assessed over all 15-minute demand averages during peak hours on weekdays. Equation (11) may be used to determine a net power demand $d_t$ as the difference between gross demand $d_{gross,t}$, gross generation $e_t$, and net power into (positive) or out of (negative) the battery, $b_t$ (if no battery is present, $b_t$ is zero). Energy charge costs for a particular period of time step may correspond to the product of a similar time-specific energy charge $p_{E_k}$, net power demand $d_t$, and a Δt/60 kW to kWh conversion factor (e.g., Equation (10)). Natural gas costs, in Equation (12) may correspond to the product of a natural gas price paid by a utility, $p_N$ assessed in $/MJ and the natural gas flow rate (converted to MJ by dividing by 24×Δt+60 and multiplying by the heat rate $h_N$ of pipeline-grade natural gas). Natural gas billing structures may also be similar to electricity billing structures, with tiered rates and customer charges, demand charges, and energy charges analogous to those specified in (8)-(10).

$$c_C = D_{bill} C_c \quad (8)$$

$$c_D = \sum_k p_{D_k} \max_{t \in \mathcal{J}_k}(d_t) \quad (9)$$

$$c_{E,t} = \frac{1}{4} \sum_k 1(t \in \mathcal{J}_k) p_{E_k} d_t \quad (10)$$

$$d_t = d_{gross,t} - e_t + b_t \quad (11)$$

$$c_{N,t} = \frac{h_N}{96} p_N n_t \quad (12)$$

The component 308 and/or component 207 may optimize energy storage over the time-steps in a running horizon, $\tau_h$, by minimizing a modified version of the cost function given in Equation (7) that accounts for incremental demand charges (i.e., maximum demand in the current period above peaks from previous periods) and balances uncertainty between eventual demand charges (assessed monthly) and energy charges (incurred continuously).

In some implementations, the horizon-specific objective in Equation (14) may balance incremental demand charges $$c_D^+$$

against energy and natural gas charges. Incremental demand charges for each demand period k may be computed as in Equation (13) as the maximum positive amount above the previous maximum in a given period and in the current month, $\bar{d}_k$ (maximum $d_t$ levels below $\bar{d}_k$ are set to zero, resulting in no incremental demand charge). To account for the fact that demand charges may be assessed once a billing period (whereas energy charges accrue at each timestep), energy and natural gas costs may be scaled by a certainty factor Γ, expressed in Equation (15) as the ratio of the number of days left in a billing period (e.g., with total number time-steps T) and the length of the optimization horizon—and a tuning parameter γ (e.g., γ=1). The objective function given in Equation (15) may also have a storage penalty ($\Lambda_{stor}$), a wet weather penalty ($\Lambda_{ww}$), or an equalization penalty ($\Lambda_{eq}$). These may be used to represent operation of water storage for two (hypothetical) baseline use cases: (1) management of excess wet weather flows and (2) flow equalization (as discussed below).

$$\max c_D^+ + \Gamma \sum_{t \in \mathcal{J}_h} (c_{E,t} + c_{N,t}) + \Lambda_{stor} + \Lambda_{ww} + \Lambda_{eq} \quad (13)$$

$$c_D^+ = \sum_k p_{D_k} \max_{t \in \mathcal{J}_k} \left[ \left( d_t - \bar{d}_k \right)_+ \right] \quad (14)$$

$$\Gamma = \gamma \left( \frac{T - \inf \mathcal{J}_h}{|\mathcal{J}_h|} \right) \quad (15)$$

In some implementations, referring back to FIG. 3, the engine 302, and its component 308, as part of the control simulation, and/or the engine 200 and its load model 201 and optimizer 207—may be configured to execute analysis of battery storage operation at the facility. In particular, within each horizon, the component 308 and/or the component 207 may select an optimal battery charge/discharge schedule (i.e., $b_t$, $t \in \tau_h$) to minimize the objective function. This minimization may be used to simulate operation of a battery for planning purposes, execute commands on an onsite battery at a WWTP, or benchmark actual operation of an onsite battery at a facility by a third party. The constraints on battery operation may reflect the change in the battery's state of energy at each time step after accounting for self-discharge (SD) and net power flows into the battery, as represented by Equation (16). Power flows into ($b_{g,t}$) and out of ($b_{p,t}$) the battery may each be scaled by the square root of its round-trip efficiency (RTE) or some other function that represents dissipation losses, as shown by Equation (17) and are non-negative, as shown in Equation (19). The battery's power will always be constrained by its charge/discharge capacity, as shown by Equation (18). The battery's state of energy ($SOE_{b,t}$) will always be constrained to be within its energy storage capacity, expressed in Equations (20)-(22) as its nameplate capacity ($C_b$), minimum and maximum states of charge ($\underline{SOC}$ and $\overline{SOC}$, respectively) and average state of health over its lifetime ($\overline{SOH}$). The initial state of the battery in each month may be a function of time and/or previous usage $u_b$, as shown in Equation (24). The battery's average state of health may be determined by Equation (23) as a function of time and/or previous usage $u_b$.

$$SOE_{b,t} = SOE_{b,t-1} \times SD + \frac{b_t}{4} \tag{16}$$

$$b_t = \sqrt{RTE}\, b_{g,t} - \frac{b_{p,t}}{\sqrt{RTE}} \tag{17}$$

$$b^- \leq b_t \leq b^+ \tag{18}$$

$$b_{g,t},\ b_{p,t} \geq 0 \tag{19}$$

$$\underline{SOE}_b \leq SOE_{b,t} \leq \overline{SOE}_b \tag{20}$$

$$\underline{SOE}_b = C_b \times \underline{SOC} \times \overline{SOH} \tag{21}$$

$$\overline{SOE}_b = C_b \times \overline{SOC} \times \overline{SOH} \tag{22}$$

$$\overline{SOH} = f_{\overline{SOH}}(t - \mathcal{U}_b) \tag{23}$$

$$SOE_{b,0} = f_{SOE_{b,o}}(t, \mathcal{U}_b) \tag{24}$$

The component 308 and/or the components 201 and 207 may further perform analysis of biogas storage operation at the facility as a way of planning upgrades to a new biogas storage system, operating a new biogas storage system, or improving operation of an existing biogas storage system. This biogas storage system may consist of a low-pressure membrane gas holder, a medium pressure gas storage tank, liquefied biomethane storage tank, or available headspace in a digester and biogas piping system (encompassing volume in the pipes between the digester outlet, the biogas upgrading processes, and the CHP fuel inlet). The optimization program may select optimal flows of biogas into and out of the biogas storage system. All biogas produced by the digesters that is not flared may be assumed to flow into the biogas storage system. Prior to combustion, biogas from storage may be assumed to flow to an upgrading process that removes water vapor, siloxanes, and sulphates. The net flowrate of biogas into the biogas storage system ($g_{h,t}$) may be computed as the difference between rate of flow from the digester to the biogas storage system ($g_{dh,t}$) and from the biogas storage system to the upgrading unit ($g_{he,t}$) in Equation (26), both of which are non-negative as in Equation (29). The volume of gas in the biogas storage system at each time-step ($SOV_{h,t}$) is its value at the previous time-step multiplied by a leakage value (which may be expressed as a function $f_{leak}$ of the previous storage volume) plus net flowrate of biogas into the storage system in the current time-period, divided by a conversion factor of 24×60÷Δt, as shown by Equation (25). The initial state of volume in each month may be a function of time t and/or previous usage $u_g$, as shown by Equation (30).

The biogas storage system's storage volume must be positive and within its storage capacity $C_g$, as shown in Equation (27). Biogas storage systems use may use power $\Delta_{d_{gross,gt}}$ at each timestep to compress biogas. This may be a function $f_{d_{gross,g}}$ of flows of biogas into the biogas storage system and/or volume of biogas currently in the storage system, as in Equation (28).

$$SOV_{h,t} = SOV_{h,t-1} \times f_{leak}(SOV_{h,t}) + \frac{g_{h,t}}{24 \times 60 \div \Delta t} \tag{25}$$

$$g_{h,t} = g_{dh,t} - g_{he,t} \tag{26}$$

$$0 \leq SOV_{h,t} \leq C_g \tag{27}$$

$$\Delta_{d_{gross,g,t}} = f_{d_{gross,g}}(g_{dh,t}, SOV_{h,t}) \tag{28}$$

$$g_{dh,t},\ g_{he,t} \geq 0 \tag{29}$$

$$SOV_{g,0} = f_{sov_{g,o}}(t, \mathcal{U}_g) \tag{30}$$

The components 308 and/or components 201 and 207 may also perform analysis of wastewater storage operation at the facility. Wastewater storage operation may depend strongly on how the wastewater storage system fits into an existing treatment system configuration, e.g., a storage of raw wastewater prior to any treatment, storage of primary effluent after primary treatment (but before secondary treatment), or storage of secondary effluent after secondary treatment (but before disinfection and/or treatment in a recycled water facility). For example, raw wastewater storage may offer greater energy savings (e.g., by avoiding energy for influent pumping and primary treatment) but may require mixing and/or daily cleaning to prevent settling of suspended waste and anoxic conditions. Storage of primary effluent may require little to no energy for aeration but may offer less energy savings, less storage volume, or less protection of the wastewater treatment system against wet weather events.

For any wastewater storage configuration, the component 308 and/or components 201 and 207 may select flows of a volume of wastewater to treat (e.g., primary effluent or secondary effluent) at each time step ($w_{tr,t}$), with upstream wastewater flows $w_{i,t}$ a given variable (these can be raw wastewater influent, or secondary effluent, if the storage system stores secondary effluent). This selection can be part of an implementation that simulates the benefits of investments in new wastewater storage capacity, operates existing wastewater storage capacity, or benchmarks operation of existing wastewater storage capacity. As with battery and gas storage, the volume of water storage in the water tank $SOV_{w,t}$ will be governed by some recursive relation, such as that given in Equation (32), which adds the net flowrate into water storage in the current time-step ($w_{net,t}$, converted from units of $m^3/d$ to $m^3$ by dividing by 24×60÷Δt) to the previous volume in storage. Losses of stored water (i.e., from leaks or evaporation) may be assumed to be negligible. The volume of water in storage will always be positive and below the volume of the storage tank $C_w$, as in Equation (38). The initial state of volume of the water storage tank may a function $fSOV_{w,0}$ of time t or previous usage $u_w$ (39). The net water flow into the storage tank may be determined as the difference between flows into the storage tank ($w_{is,t}$) and from the storage tank to a facility's treatment train ($w_{str,t}$), as in Equation (33), which are both non-negative, as in Equation (34). Power needed to operate the wastewater storage system at each timestep, $\Delta_{d_{gross,w,t}}$, may be a function of power needed to pump wastewater from the treatment train into the storage system, pump wastewater from the storage system to the treatment train, and/or mix or aerate volume of wastewater in storage (40). Flows of wastewater into and out of the wastewater storage system are limited by the capacity of the storage tank's pumps, as in Equations (35)-(36). The constraint in Equation (37) is a mass balance that ensures that treated wastewater flows at each time-step are equal to influent flows minus the net flow of wastewater into the storage system.

$$SOV_{w,t} = SOV_{w,t-1} + \frac{w_{net,t}}{96} \tag{32}$$

$$w_{net,t} = w_{is,t} - w_{str,t} \tag{33}$$

$$w_{is,t},\ w_{str,t},\ w_{tr,t} \geq 0 \tag{34}$$

$$0 \leq w_{is,t} \leq C_{pis} \tag{35}$$

$$0 \leq w_{str,t} \leq C_{pstr} \tag{36}$$

-continued $$w_{tr,t} = w_{i,t} - w_{net,t} \tag{37}$$

$$0 \le SOV_{w,t} \le C_w \tag{38}$$

$$SOV_{w,0} = f_{SOV_{w,0}}(t, \mathcal{U}_w) \tag{39}$$

$$\Delta_{d_{grossw,t}} = f_{d_{gross,w}}(w_{is,t}, w_{tr,t}, SOV_{w,t}) \tag{40}$$

The component 308 and/or components 201 and 207 may use several other constraints in addition to constraints shown in Equations (32)-(40) above to ensure the treatment system operates within feasible and safe volumetric bounds and hydraulic retention time in the storage tanks stays within a 24-hour limit (preventing issues with solids settling, anoxic conditions, and odors).

Additionally, other modeling equality constraints may be used by components 308 and/or components 201 and 207 to represent the coupling between power consumption, biogas production, and biosolids production and altered treatment flow regimes chosen by the controller. For illustrative purposes, assume that the wastewater storage system in question is a primary effluent storage system. In some implementation of the system, the vector of thickened primary solids volume flows to the facility's digesters for a given time horizon, TPS, may be a function $f_{TPS}$ of another vector of influent flows $w_i$ (which may include influent flows prior to the flows of thickened primary solids being modeled), time t, and a vector of previous flows of thickened primary solids $\widetilde{TPS}$ (41). The vector of thickened waste activated sludge to the facility's digesters, TWAS, may be a function $f_{TWAS}$ of another vector of treatment flows $w_{tr}$ (which may include influent flows prior to the flows of thickened waste activated sludge being modeled), time t, and a vector of previous flows of thickened waste activated sludge $\widetilde{TWAS}$ (42). The vector of biogas production volumes g may be a function $f_g$ of other vectors of thickened primary solids, thickened waste activated sludge, fats oils and greases, other solids waste flows (all solids flows may include solids flows prior to the flows of produced biogas being modeled), time t, and a vector of previous flows of produced biogas $\tilde{g}$(43). The vector of gross electric power consumption may be a function $f_{d_{gross}}$ of the vector of influent flows $w_{tr}$, treatment flows $w_{tr}$ chosen by the optimization program (both of which may include wastewater flows prior to the power demand being modeled), time, the vector of previous gross electric power consumption $\tilde{d}_{gross}$, and other factors relevant to power consumption. These modeling dependencies will depend on the configuration of the wastewater storage system. For example, if the wastewater storage system involves storage of raw wastewater, then $w_i$ and $w_{tr}$ may be assumed to be equal. Alternatively, if the wastewater storage system involves storage of secondary effluent prior to treatment in a non-potable or potable reuse treatment train, the relevant treatment flows may involve wastewater treatment (combining $w_i$ and $w_{tr}$) and an additional term to represent recycled water treatment (with energy use dependencies modified accordingly).

$$TPS = f_{TPS}(w_i, t, \widetilde{TPS}) \tag{41}$$

$$TWAS = f_{TWAS}(w_{tr}, t, \widetilde{TWAS}) \tag{42}$$

$$g = \hat{f}_g(TPS, TWAS, \ldots, FOG, t, \tilde{g}) \tag{43}$$

$$d_{gross} = f_{d_{gross}}(w_i, w_{tr}, t, \tilde{d}_{gross}, \ldots) \tag{44}$$

The component 308 and/or components 201 and 207 may also perform analysis of optimal operation of a WWTP's on-site CHP system. This may be part of an implementation that simulates the benefits of a WWTP's investments in a new CHP system for planning purposes, operates an existing on-site CHP system, or benchmarks operation of an existing on-site CHP system. Optimal operation of an on-site CHP system may encompass optimal operation of existing or simulated battery storage, existing or simulated biogas storage, and existing or simulated wastewater storage, as described above. Gross electricity output for CHP unit i at time t, $e_{i,t}$, may be defined as a function of total fuel input into the unit, including all biogas from the digesters, $g_{de_i,t}$, and/or the biogas storage system $g_{he_i,t}$ and natural gas $n_{i,t}$ at time t (45). Energy input in (45) may be estimated with a constant (given) heating value for pipeline natural gas, $h_n$, a constant or time-varying estimate of the heating value of biogas at time t, $h_{g,t}$, and a constant or time-varying estimate of the CHP unit's efficiency at time t, $\eta_{i,t}$. The vector of heat contents of biogas input into the digesters during an optimization time horizon, $h_g$, may be a function $f_{h_g}$, of the vectors of volumes of biosolids fed to the digester, including thickened primary solids, thickened waste activated sludge, fats oils and greases, or any other biosolids and/or food wastes (all of these may include biosolids flows prior to the flows of thickened waste activated sludge being modeled), and a vector of previous biogas heating values, $\tilde{h}_g$.

The vector of CHP unit efficiencies during a time horizon, $\eta_i$, may be a constant or a function $f_{\eta i}$ of a vector of the unit's gross electric output $e_i$ (which may include gross electric output prior to the efficiency of the CHP unit when it is being modeled), time, and a vector of the unit's previous efficiencies, $\tilde{\eta}_i$.

For illustrative purposes, assume a facility purchases natural gas and blends it with its biogas before combustion in the CHP system. Components 308 and components 201 and 207 may optimize natural gas blending volumes $n_t$ by selecting these under the constraint that they are below the regulatory limit as in Equation (47). This allows the component 308 and components 201 and 207 to allocate natural gas purchases to time periods when they are most beneficial. Since the blending share limit $\pi_n$ is assessed monthly, the blending share targeted within a given multi-day control horizon is $\bar{\pi}_{\tau_h}$ and may be adjusted in Equation (48) to account for over- or under-shooting of the average blend share achieved over previous control horizons ($\pi_{\tau_{h-1}}$, computed in Equation (49)). The adjustment will ensure that $\bar{\pi}_{\tau_h}$ is always positive.

$$e_{i,t} = \frac{\eta_{i,t}}{3.6 \times 24}\left[h_{g,t}(g_{de_i,t} + g_{he_i,t}) + h_n n_{i,t}\right] \tag{45}$$

$$h_g = f_{h_g}(TWAS, TPS, FOG, \ldots, \tilde{h}_g),\ h_g = \begin{bmatrix} h_{g,t_1} \\ h_{g,t_2} \\ \ldots \\ h_{g,t_T} \end{bmatrix} \tag{46}$$

$$\eta_i = f_{\eta_i}(e_i, t, \tilde{\eta}_i)$$

$$\sum_{t \in \mathcal{J}_h} n_t \le \bar{\pi}_{\mathcal{J}_h} \sum_{t \in \mathcal{J}_h} (n_t + g_{de,t} + g_{he,t}) \tag{47}$$

$$\bar{\pi}_{\mathcal{J}_h} = \left(\frac{T\pi_n - sup(\mathcal{J}_{h-1})\pi_{\mathcal{J}_{h-1}}}{T - sup(\mathcal{J}_{h-1})}\right)_+ \tag{48}$$

$$\pi_{\mathcal{J}_{h-1}} = \frac{\sum_{t=1}^{sup(\mathcal{J}_{h-1})} n_t}{\sum_{t=1}^{sup(\mathcal{J}_{h-1})} (n_t + g_{de,t} + g_{he,t})} \tag{49}$$

Referring back to FIG. 3, subsequent to the control simulations performed by the control simulation component 308, various monetary performance metrics for energy flexibility upgrades or operational improvements by a WWTP may be determined. As part of the analysis, an analysis based on the expected benefits of energy storage upgrades may be performed. Energy benefits may be estimated by running the control simulation on a set of sampled months of the facility's digital twin component 306. For each sample time period (e.g., a month, etc.), benefits may be estimated in Equation (51) as the difference in energy costs c as a function of baseline net demand (i.e., baseline purchases of electricity, $d_{0j}$) and as a function of counterfactual, optimized net facility demand $d_j$ (i.e., net demand for wastewater treatment plus electricity purchases by the battery, if applicable) minus total operations and maintenance costs, o&m, for the energy storage upgrades modeled. The cost function may be determined using Equation (7) above.

As shown by Equations (51) and (52), this process may add a mean zero error e to both baseline demand, $d_{0j}$, and optimized net demand, $d_j$, to account for forecasting errors in the controller. This can the forecasting error ($\varepsilon_t$) may be drawn from a distribution D with mean 0 and time-dependent standard deviation $\sigma_t$ (53). The time-dependent standard deviation may be a function $f_\sigma$ of demand, baseline net demand, and optimized net demand (54).

$$\text{benefit}_j = c(\tilde{d}_{0j}) - c(\tilde{d}_j) - o\,\&m \quad (50)$$

$$\tilde{d}_{0j} = d_{0j} + \epsilon \quad (51)$$

$$\tilde{d}_j = d_j + b_{g,j} + \epsilon \quad (52)$$

-continued $$\epsilon = \begin{bmatrix} \epsilon_1 \\ \dots \\ \epsilon_T \end{bmatrix}, \epsilon_t \sim \mathcal{D}(0,\ \sigma_t) \quad (53)$$

$$\sigma_t = f_\sigma(d, d_0, t) \quad (54)$$

The operation and maintenance costs of energy flexibility related to electricity consumption (e.g., battery RTE, pumping and mixing costs for energy storage) may already be incorporated into the runtime control simulation. Additional operation and maintenance costs (e.g., cleaning, inspection, repair) may be estimated for each energy storage system separately using various existing or known parameters. For example, for batteries and water storage, annual operation and maintenance costs (o&m) may be an assumed fraction $k_{om}$ of total capital expenditure C (i.e., equipment costs) (55). As another example, operation and maintenance costs for gas storage may be expressed as a share $k_{gh}$ of total annual MWh of energy recovered from biogas (56). Table 3 illustrates exemplary, experimental values of operating and maintenance cost parameters.

$$o\,\&m = \frac{1}{12} k_{om} C \quad (55)$$

$$o\,\&m = k_{gh} \frac{1}{4 \times 1000} \sum_t e_t \quad (56)$$

TABLE 3

Exemplary experimental values of operating and maintenance cost parameters.

| Storage Type | Cost Parameter | Value | Range | Units |
|---|---|---|---|---|
| Battery | variable cost (power) | 400 | 300-500 | $/kW |
| | variable cost (energy) | 200 | 100-300 | $/kWh |
| | fixed cost | 300 | 200 k-300 k | $k |
| | operation & maintenance | 0.03 | 0.01-0.05 | $/$-capex-year |
| | lifetime | 15 | 10-20 | years |
| Gas storage | fixed cost | 70 | 50-100 | $k |
| | variable cost | 500 | 400-600 | $/standard-m$^3$ |
| | operation & maintenance | 1.5 | 1-2 | $/MWh biogas |
| | lifetime | 10 | 7-15 | years |
| Water storage | fixed cost | 0 | 0-100 | $k |
| | variable cost | 300 | 200-400 | $/m^3 |
| | lifetime | 50 | 40-60 | years |
| | operation & maintenance | 0.005 | 0.001-0.01 | $/$-capex-year |
| Anaerobic digestion | fixed cost | 100 | 50-200 | $k |
| | variable cost | 0.1 | 0.05-0.2 | $/standard m$^3$ |
| | lifetime | 20 | 15-25 | years |
| | operation & maintenance | 0.03 | 0.02-0.04 | $/standard m$^3$ |
| CHP | fixed cost CHP | 0.9 | 0.5-1.5 | $m |
| | Fixed cost gas upgrade | 1.1 | 0.5-1.5 | $m |
| | variable cost (CHP) | 450 | 300-600 | $/kW |
| | variable cost (gas upgrade) | 3,000 | 2,000-4,000 | $/standard m$^3$-hour |
| | variable cost (heat recovery) | 300 | 200-400 | $/kW |
| | operation & maintenance | 0.005 | 0.002-0.008 | $/kWh |
| | lifetime | 30 | 20-40 | years |

Capital expenditures can be any arbitrary discrete or continuous function of each energy storage system's scale (i.e., storage capacity). This may depend on design information available. For example, a capital expenditure ($C_{exp}$) functions may be assumed to be linear (as shown in Equation (57)), the component 212 may determine non-scale-dependent fixed costs $f$ (e.g., installation, overhead) and scale-dependent, variable costs v that are proportional to a design parameter $x_i$ (e.g., $ per kWh of battery storage). Scale dependent parameters may include m$^3$ of water or gas storage, m$^3$/day of water pumping capacity, battery kWh and battery kW, among others $$C_{exp} = f + \Sigma_i v_i x_i \quad (57)$$

The techno-economic analysis may use bill savings, operating and maintenance costs, and capital expenditures described above to estimate the return on investment (ROI) and payback period (PBP) of energy storage system upgrades. For each simulation by component 308, ROI over the lifetime, $T_{eol}$, of energy storage system upgrades in years may be determined. When multiple storage mechanisms with different lifetimes are part of an energy flexibility upgrade portfolio, their capital costs may be scaled to the highest lifetime in the portfolio. ROI may be determined using Equation (58) as the total net earnings from energy flexibility over the lifetime of the investment portfolio, divided by capital expenditures $C_{exp}$. Total net earnings are the difference between discounted cash flows (DCF) from expected benefits of energy storage assets ($\overline{\text{benefit}}$)—and capital expenditures. Expected benefits are the average benefit across m simulation replicates (as in Equation (60)), discounted annually at rate r (as in Equation (63) to obtain a DCF value. The PBP is the expected minimum number of years in Equation (61) it takes for cumulative discounted cash flows to equal capital expenditures (see, Equation (62)).

$$ROI = \frac{DCF - C_{exp}}{C_{exp}} \tag{58}$$

$$DCF = \sum_{t=1}^{T_{eol}} \frac{12 \times \overline{benefit}}{(1+r)^t} \tag{59}$$

$$\overline{benefit} = \frac{1}{m} \sum_j \text{benefit}_j \tag{60}$$

$$PBP = \frac{1}{m} \sum_j PBP_j \tag{61}$$

$$PBP_j = \text{argmin}_{T_{0j}} \sum_{t=1}^{T_{0j}} \frac{12 \times \overline{benefit}}{(1+r)^t} \geq C_{exp} \tag{62}$$

Referring back to FIG. 3, the engine 302 may be configured to execute sensitivity analysis. The sensitivity analysis may be executed to evaluate how the performance of energy flexibility assets varies with key design and modeling parameters and assumptions. For example, the sensitivity analysis may examine the marginal impact of a given parameter on the lifetime ROI of investments in energy flexibility upgrades (i.e., the ROI of an investment computed over its lifetime).

Figure 7:
FIG. 7 illustrates an example of a system, according to some implementations of the current subject matter.
Figure 7:
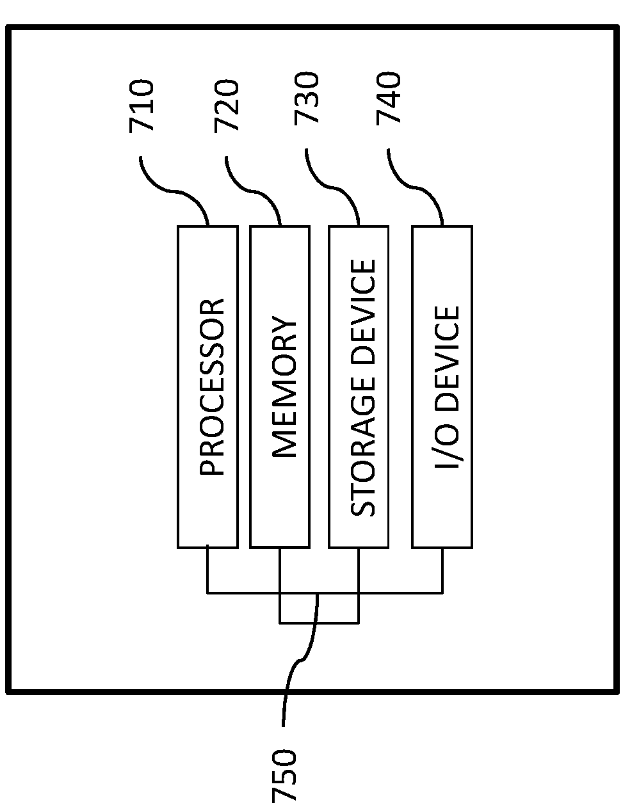

In some implementations, the current subject matter can be configured to be implemented in a system 700, as shown in FIG. 7. For example, any of the components described or depicted herein. The system 700 can include a processor 710, a memory 720, a storage device 730, and an input/output device 740. Each of the components 710-440 can be interconnected using a system bus 750. The processor 710 can be configured to process instructions for execution within the system 700. In some implementations, the processor 710 can be a single-threaded processor. In alternate implementations, the processor 710 can be a multi-threaded processor or a graphics processor unit (GPU). The processor 710 can be further configured to process instructions stored in the memory 720 or on the storage device 730, including receiving or sending information through the input/output device 740. The memory 720 can store information within the system 700. In some implementations, the memory 720 can be a computer-readable medium. In alternate implementations, the memory 720 can be a volatile memory unit. In yet some implementations, the memory 720 can be a non-volatile memory unit. The storage device 730 can be capable of providing mass storage for the system 700. In some implementations, the storage device 730 can be a computer-readable medium. In alternate implementations, the storage device 730 can be a floppy disk device, a hard disk device, an optical disk device, a tape device, non-volatile solid-state memory, or any other type of storage device. The input/output device 740 can be configured to provide input/output operations for the system 700. In some implementations, the input/output device 740 can include a keyboard and/or pointing device. In alternate implementations, the input/output device 740 can include a display unit for displaying graphical user interfaces.

Figure 8:
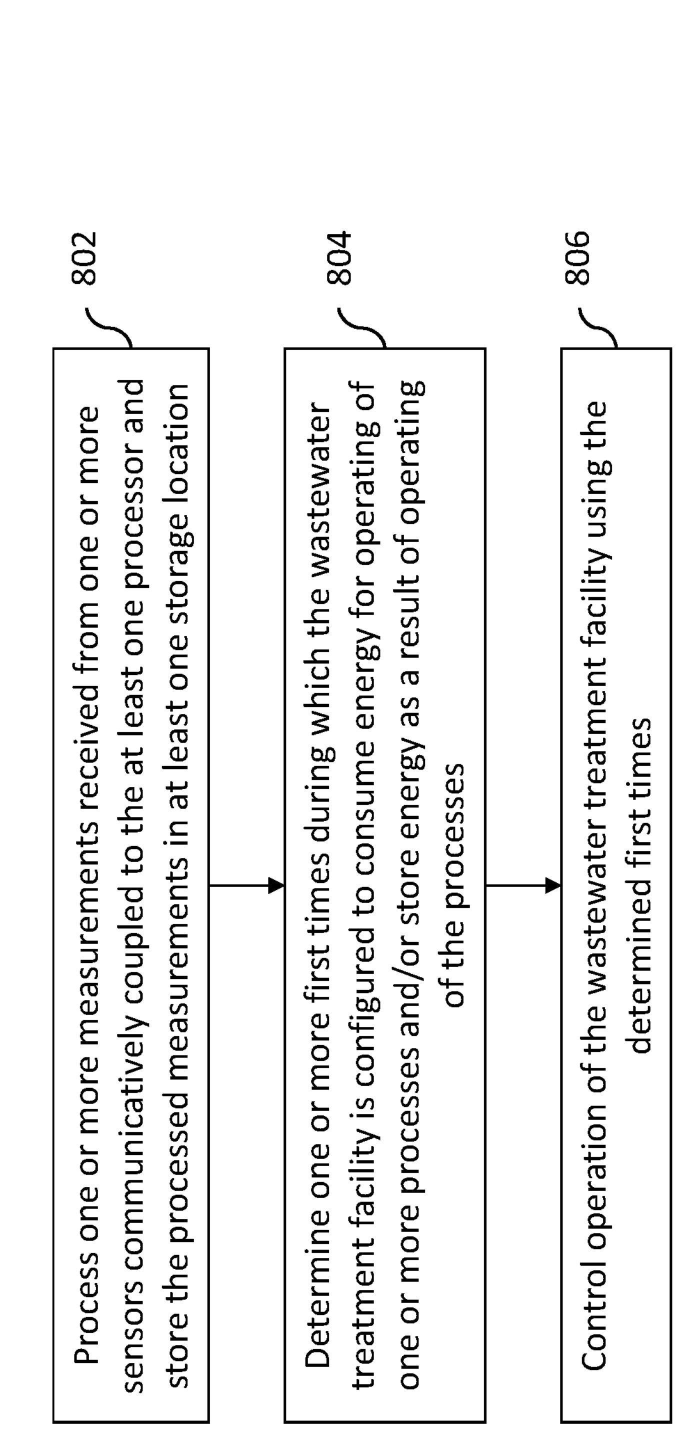
FIG. 8 illustrates an example of a method, according to some implementations of the current subject matter.

FIG. 8 illustrates an exemplary process 800 for managing energy consumption by a wastewater treatment facility (e.g., directly through engine 200 shown in FIG. 2, and/or, indirectly, through engine 302 shown in FIG. 2), according to some implementations of the current subject matter. The process 800 may be executed using one or more components of the systems shown in FIGS. 2-3 and/or processes shown in FIGS. 4-6. In particular, the engine 302, shown in FIG. 3, may be configured to simulate optimized energy consumption by the facility based on specific data (e.g., parameters) that it may receive from one or more sensors, and the engine 200, shown in FIG. 2, may be configured to optimally operate energy consumption by the facility based on specific data, as discussed above with regard to FIGS. 2-3.

At 802, the engine 302 (as shown in FIG. 3), may be configured to process one or more measurements received from one or more sensors communicatively coupled to the engine 302. The sensors may monitor and measure at least one of: one or more operational parameters associated with operation of at least one wastewater treatment facility (e.g., wastewater flow, wastewater quality, sludge flow, sludge solids concentration, biogas production and/or storage, etc.), one or more external parameters associated with an environment (e.g., weather, temperature, humidity, etc.) of the wastewater treatment facility, and one or more energy parameters associated with an energy consumption (e.g., electricity purchased from the grid, natural gas purchases from the grid, energy produced by on-site solar generation etc.), and energy generation (e.g., generation from biogas combusted in an on-site CHP, generation from on-site solar photovoltaic arrays etc.) by the wastewater treatment facility for operating of one or more processes (e.g., processing of wastewater, biogas production, etc.) of the at least one wastewater treatment facility. The engines 302 and 200 may also be configured to store the processed measurements in at least one storage location (e.g., database 221 shown in FIG. 2).

At 804, the engines 302 and 200 may be configured to determine one or more times during which the wastewater treatment facility is configured to perform at least one of: consume energy for operating of one or more processes, produce energy for operating of one or more processes or for provision of energy and/or energy services to the electricity grid, and/or store energy as a result of operating of the processes. The determination may be made based on the processed measurements. The determination may be made based on the analysis performed by the control simulation component 308, digital twin component 306, as shown in FIG. 3, or the facility load model 201 and optimizer 207, as shown in FIG. 2.

At 806, the engine 200 may be configured to transmit data to facility's control system (e.g., control system interface 213) that may execute control of operation of the wastewater treatment facility using the determined one or more times.

In some implementations, the current subject matter may be configured to include one or more of the following optional features. The operational parameters may include at least one of the following: a flow of wastewater into the at least one wastewater treatment facility, a flow of processed wastewater between one or more unit processes of the at least one wastewater treatment facility, a flow of primary solids out of one or more primary treatment processes of the at least one wastewater facility, a flow of waste activated sludge out of one or more secondary processes of the at least one wastewater treatment facility, a flow of at least one of fats, oils and greases received by the at least one wastewater treatment facility and injected into one or more anaerobic digesters of the at least one wastewater treatment facility, a flow of food and/or organic wastes received by the at least one wastewater treatment facility and injected into one or more anaerobic digesters of the at least one wastewater treatment facility, a concentration of total and volatile solids, chemical oxygen demand, total nitrogen, and ammonia in flows of primary solids out of one or more primary treatment processes of the at least one wastewater facility, a concentration of total and volatile solids, chemical oxygen demand, total nitrogen, and ammonia of flows of waste activated sludge our of one or more secondary processes of the at least one wastewater treatment facility, a concentration of total and volatile solids, chemical oxygen demand, total nitrogen, and ammonia in flows of at least one of fats, oils and greases received by the at least one wastewater treatment facility, a concentration of total and volatile solids, chemical oxygen demand, total nitrogen, and ammonia of a flow of food and/or organic wastes received by the at least one wastewater treatment facility, a concentration of total and volatile solids, chemical oxygen demand, total nitrogen, and ammonia in the one or more anaerobic digesters of the at least one wastewater treatment facility, an amount of raw wastewater stored at the at least one wastewater treatment facility, an amount of processed wastewater stored at the at least one wastewater treatment facility a temperature associated with operating one or more processes of the at least one wastewater treatment facility, a temperature associated with operating one or more on-site co-generation units of the at least one wastewater treatment facility to generate at least one of heat and electricity, a pressure associated with operating one or more processes of the at least one wastewater treatment facility, and any combination thereof.

In some implementations, the external parameters may include at least one of the following: an external temperature corresponding to a temperature of air outside of the wastewater treatment facility, an internal temperature corresponding a temperature of air at the wastewater treatment facility, an external humidity corresponding a humidity of air outside of the wastewater treatment facility, an internal humidity corresponding a humidity of air at the wastewater treatment facility, an external precipitation amount corresponding to the local precipitation at wastewater treatment facility's location, and any combination thereof.

In some implementations, the power consumption parameters may include at least one of the following: wherein the one or more power consumption parameters include at least one of the following: an amount of electricity consumed for operating one or more of the facility's treatment processes and auxiliary processes, an amount of electricity consumed for operating one or more of the facility's direct or indirect energy storage systems, an amount of electricity consumed to operate a heat pump, and any combination thereof.

In some implementations, the power generation parameters may include at least one of the following: a flow of biogas generated by the wastewater treatment facility, a heating value of biogas generated by the wastewater treatment facility, a flow of natural gas consumed by the wastewater treatment facility for operation of the processes, an amount of electricity generated by an on-site combustion turbine or internal combustion engine, an energy generated by an on-site combustion turbine or internal combustion engine operating for combined heat and power, an amount of electricity generated by an array of on-site solar photovoltaic panels, an amount of electricity generated by an on-site wind turbine, an amount of electricity generated by a microbial fuel cell, an amount of electricity generated by a biogas fuel cell, and any combination thereof In some implementations, the energy storage parameters may include at least one of the following: an amount of energy stored in an on-site battery of the at least one wastewater treatment facility, an amount of electric power flowing into or out of an on-site battery of the at least one wastewater treatment facility, a state of health of an on-site battery of the at least one wastewater treatment facility, a state of charge of an on-site battery of the at least one wastewater treatment facility, a volume stored in a raw wastewater storage tank of the at least one wastewater treatment facility, a volume stored in a primary effluent storage tank of the at least one wastewater treatment facility, a volume stored in a secondary effluent storage tank of the at least one wastewater treatment facility, a volume stored in a low pressure membrane biogas holder of the at least one wastewater treatment facility, a volume stored in a medium pressure biogas storage tank of the at least one wastewater treatment facility, a volume stored in liquefied biogas storage tank of the at least one wastewater treatment facility, a volume stored in an anaerobic digester's headspace and available piping volume capacity preceding a co-generation fuel inlet valve of the at least one wastewater treatment facility, a volume stored in an oxygen tank of the at least one wastewater treatment facility, a volume of flows into and out of all of the storage tanks specified above of the at least one wastewater treatment facility, a dissolved oxygen concentration in an activated sludge basin, trickling filter, or aerobic membrane bioreactor of the at least one wastewater treatment facility, an amount of oxygen flowing into an activated sludge basin, trickling filter, or aerobic membrane bioreactor of the at least one wastewater treatment facility, a volume and a total and volatile solids concentration stored in a sludge holding tank, a volume and a total and volatile solids concentration stored in a fats oils and greases holding tank, a volume and a total and volatile solids concentration stored in a food waste tank of the at least one wastewater treatment facility, a volume and a total and volatile solids concentration stored in an organic wastes tank of the at least one wastewater treatment facility, a flow into or out of any of the biosolids holding tanks of the at least one wastewater treatment facility, and any combination thereof.

In some implementations, the determining may include training at least one model using at least one of: the operational parameters, the external parameters, the power consumption parameters, the power generation parameters, the direct and/or indirect energy storage parameters, and any combination thereof, and forecasting, using the trained model, the times during which the wastewater treatment facility is configured to at least one of: consume energy for operating of the processes and store energy as a result of operating of the processes.

In some implementations, the determining may include determining the times to reduce a power consumption by the wastewater treatment facility.

In some implementations, the controlling may include executing one or more processes at the determined times.

The systems and methods disclosed herein can be embodied in various forms including, for example, a data processor, such as a computer that also includes a database, digital electronic circuitry, firmware, software, or in combinations of them. Moreover, the above-noted features and other aspects and principles of the present disclosed implementations can be implemented in various environments. Such environments and related applications can be specially constructed for performing the various processes and operations according to the disclosed implementations or they can include a general-purpose computer or computing platform selectively activated or reconfigured by code to provide the necessary functionality. The processes disclosed herein are not inherently related to any particular computer, network, architecture, environment, or other apparatus, and can be implemented by a suitable combination of hardware, software, and/or firmware. For example, various general-purpose machines can be used with programs written in accordance with teachings of the disclosed implementations, or it can be more convenient to construct a specialized apparatus or system to perform the required methods and techniques.

The systems and methods disclosed herein can be implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

As used herein, the term "user" can refer to any entity including a person or a computer.

Although ordinal numbers such as first, second, and the like can, in some situations, relate to an order; as used in this document ordinal numbers do not necessarily imply an order. For example, ordinal numbers can be merely used to distinguish one item from another. For example, to distinguish a first event from a second event, but need not imply any chronological ordering or a fixed reference system (such that a first event in one paragraph of the description can be different from a first event in another paragraph of the description).

These computer programs, which can also be referred to programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random-access memory associated with one or more physical processor cores.

To provide for interaction with a user, the subject matter described herein can be implemented on a computer having a display device, such as for example a cathode ray tube (CRT) or a liquid crystal display (LCD) monitor for displaying information to the user and a keyboard and a pointing device, such as for example a mouse or a trackball, by which the user can provide input to the computer. Other kinds of devices can be used to provide for interaction with a user as well. For example, feedback provided to the user can be any form of sensory feedback, such as for example visual feedback, auditory feedback, or tactile feedback; and input from the user can be received in any form, including, but not limited to, acoustic, speech, or tactile input.

The subject matter described herein can be implemented in a computing system that includes a back-end component, such as for example one or more data servers, or that includes a middleware component, such as for example one or more application servers, or that includes a front-end component, such as for example one or more client computers having a graphical user interface or a Web browser through which a user can interact with an implementation of the subject matter described herein, or any combination of such back-end, middleware, or front-end components. The components of the system can be interconnected by any form or medium of digital data communication, such as for example a communication network. Examples of communication networks include, but are not limited to, a local area network ("LAN"), a wide area network ("WAN"), and the Internet.

The computing system can include clients and servers. A client and server are generally, but not exclusively, remote from each other and typically interact through a communication network. The relationship of client and server arises by virtue of computer programs running on the respective computers and having a client-server relationship to each other.

The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and sub-combinations of the disclosed features and/or combinations and sub-combinations of several further features disclosed above. In addition, the logic flows depicted in the accompanying figures and/or described herein do not necessarily require the particular order shown, or sequential order, to achieve desirable results. Other implementations can be within the scope of the following claims.

What is claimed:

1. A computer implemented method comprising:

processing, using at least one processor, one or more measurements received from one or more sensors of at least one wastewater treatment facility communicatively coupled to the at least one processor;

determining, using the at least one processor, based on the processed one or more measurements, one or more first times;

determining, using the at least one processor, at least one of one or more optimal future direct or one or more of indirect energy storage upgrades and one or more energy generation upgrades for implementation at the at least one wastewater treatment facility in accordance with the determined one or more times; and controlling, using the at least one processor, operation of the at least on wastewater treatment facility using the determined one or more first times.

2. The method according to claim 1, wherein the one or more sensors monitor and measure at least one of: one or more operational parameters associated with operation of at least one wastewater treatment facility, one or more external parameters associated with an environment of the at least one wastewater treatment facility, one or more power parameters associated with a power consumption by the at least one wastewater treatment facility for operating of one or more processes of the at least one wastewater treatment facility, one or more power parameters associated with power generation by the at least one wastewater treatment facility from one or more on-site electricity generation resources, one or more parameters associated with at least one of direct and indirect energy storage by the at least one wastewater treatment facility, and any combination thereof.

3. The method according to claim 2, wherein the one or more first times include one or more times during which the at least one wastewater treatment facility is configured to at least one of: consume energy for operating of the one or more processes, produce energy for operating of the one or more processes, and at least one of directly or indirectly store one or more codependent types of energy as a result of operating of one or more operationally co-dependent processes, and any combination thereof.

4. The method according to claim 2, wherein the one or more operational parameters include at least one of the following: a flow of wastewater into the at least one wastewater treatment facility, a flow of processed wastewater between one or more unit processes of the at least one wastewater treatment facility; a flow of primary solids out of one or more primary treatment processes of the at least one wastewater facility; a flow of waste activated sludge out of one or more secondary processes of the at least one wastewater treatment facility; a flow of at least one of fats, oils and greases received by the at least one wastewater treatment facility and injected into one or more anaerobic digesters of the at least one wastewater treatment facility; a flow of at least one of food or organic wastes received by the at least one wastewater treatment facility and injected into one or more anaerobic digesters of the at least one wastewater treatment facility; a concentration of total and volatile solids, chemical oxygen demand, total nitrogen, and ammonia in flows of primary solids out of one or more primary treatment processes of the at least one wastewater facility; a concentration of total and volatile solids, chemical oxygen demand, total nitrogen, and ammonia in flows of waste activated sludge of one or more secondary processes of the at least one wastewater treatment facility; a concentration of total and volatile solids, chemical oxygen demand, total nitrogen, and ammonia in flows of at least one of fats, oils and greases received by the at least one wastewater treatment facility; a concentration of total and volatile solids, chemical oxygen demand, total nitrogen, and ammonia in flows of at least one of food or organic wastes received by the at least one wastewater treatment facility; a concentration of total and volatile solids, chemical oxygen demand, total nitrogen, and ammonia in the one or more anaerobic digesters of the at least one wastewater treatment facility; an amount of raw wastewater stored at the at least one wastewater treatment facility; an amount of processed wastewater stored at the at least one wastewater treatment facility; a temperature associated with operating one or more processes of the at least one wastewater treatment facility; a temperature associated with operating one or more on-site co-generation units of the at least one wastewater treatment facility to generate at least one of heat and electricity; a pressure associated with operating one or more processes of the at least one wastewater treatment facility; and any combination thereof.

5. The method according to claim 2, wherein the one or more external parameters include at least one of the following: an external temperature corresponding to a temperature of air outside of the at least one wastewater treatment facility, an internal temperature corresponding a temperature of air at the at least one wastewater treatment facility, an external humidity corresponding a humidity of air outside of the at least one wastewater treatment facility, an internal humidity corresponding a humidity of air at the at least one wastewater treatment facility, an external precipitation amount corresponding to the local precipitation at a location of the at least one wastewater treatment facility, and any combination thereof.

6. The method according to claim 2, wherein the one or more power consumption parameters include at least one of the following: an amount of electricity consumed for operating at least one of one or more treatment processes or auxiliary processes of the at least one wastewater treatment facility, an amount of electricity consumed for operating at least one of one or more direct or one or more indirect energy storage systems of the at least one wastewater treatment facility, an amount of electricity consumed to operate a heat pump of the at least one wastewater treatment facility, and any combination thereof.

7. The method according to claim 2, wherein the one or more power generation parameters include at least one of the following: a flow of biogas generated by the at least one wastewater treatment facility, a heating value of biogas generated by the at least one wastewater treatment facility, a flow of natural gas consumed by the at least one wastewater treatment facility for operation of one or more processes, an amount of electricity generated by at least one of an on-site combustion turbine or an internal combustion engine of the at least one wastewater treatment facility, an energy generated by at least one of on-site combustion turbine or internal combustion engine operating for combined heat and power of the at least one wastewater treatment facility, an amount of electricity generated by an array of on-site solar photovoltaic panels of the at least one wastewater treatment facility, an amount of electricity generated by an on-site wind turbine of the at least one wastewater treatment facility, an amount of electricity generated by a microbial fuel cell of the at least one wastewater treatment facility, an amount of electricity generated by a biogas fuel cell of the at least one wastewater treatment facility, and any combination thereof.

8. The method according to claim 2, wherein the one or more direct or indirect energy storage parameters include at least one of the following: an amount of energy stored in an on-site battery of the at least one wastewater treatment facility, an amount of electric power flowing into or out of an on-site battery of the at least one wastewater treatment facility, a state of health of an on-site battery of the at least one wastewater treatment facility, a state of charge of an on-site battery of the at least one wastewater treatment facility, a volume stored in a raw wastewater storage tank of the at least one wastewater treatment facility, a volume stored in a primary effluent storage tank of the at least one wastewater treatment facility, a volume stored in a secondary effluent storage tank of the at least one wastewater treatment facility, a volume stored in a low pressure membrane biogas holder of the at least one wastewater treatment facility, a volume stored in a medium pressure biogas storage tank of the at least one wastewater treatment facility, a volume stored in liquefied biogas storage tank of the at least one wastewater treatment facility, a volume stored in an anaerobic digester's heads pace and available piping volume capacity preceding a cogeneration fuel inlet valve of the at least one wastewater treatment facility, an oxygen volume or pressure stored of an oxygen tank of the at least one wastewater treatment facility, a volume of flows into and out of all of the storage tanks specified above of the at least one wastewater treatment facility, a dissolved oxygen concentration in an activated sludge basin, trickling filter, or aerobic membrane bioreactor of the at least one wastewater treatment facility, an amount of oxygen flowing into an activated sludge basin, trickling filter, or aerobic membrane bioreactor of the at least one wastewater treatment facility, a volume and a total and volatile solids concentration stored in a sludge holding tank, a volume and a total and volatile solids concentration stored in a fats oils and greases holding tank, a volume and a total and volatile solids concentration stored in a food waste tank of the at least one wastewater treatment facility, a volume and a total and volatile solids concentration stored in an organic wastes tank of the at least one wastewater treatment facility, a flow into or out of any of the biosolids holding tanks of the at least one wastewater treatment facility, and any combination thereof.

9. The method of claim 2, wherein the determining includes training at least one model using at least one of: the one or more operational parameters, the one or more external parameters, the one or more power consumption parameters, the one or more power generation parameters, the one or more direct or indirect energy storage parameters, and any combination thereof, forecasting, using the trained model, the one or more first times during which the at least one wastewater treatment facility is configured to at least one of: consume energy for operating of the one or more processes, produce energy for operating of the one or more processes, and store energy as a result of operating of the oner or more processes.

10. The method according to claim 1, wherein the determining includes determining the one or more times to reduce a power consumption by the at least one wastewater treatment facility.

11. The method according to claim 1, wherein the controlling includes executing, using the at least one processor, the one or more processes at the determined one or more times.

12. A system comprising:

at least one programmable processor; and a non-transitory machine-readable medium storing instructions that, when executed by the at least one programmable processor cause the at least one programmable processor to perform operation comprising:

processing, using at least one processor, one or more measurements received from one or more sensors of at least one wastewater treatment facility communicatively coupled to the at least one processor, and storing the processed one or more measurements in at least one storage location;

determining, using the at least one processor, based on the processed one or more measurements, one or more first times;

determining, using the at least one processor, at least one of one or more optimal future direct or one or more of indirect energy storage upgrades and one or more energy generation upgrades for implementation at the at least one wastewater treatment facility in accordance with the determined one or more times; and controlling, using the at least one processor, operation of the at least one wastewater treatment facility using the determined one or more first times.

13. A computer program product comprising a non-transitory machine-readable medium storing instructions that, when executed by at least one programmable processor, caused the at least one programmable processor to perform operations comprising:

processing, using at least one processor, based on the processed one or more measurements, one or more first times;

determining, using the at least one processor, based on the processed one or more measurements, one or more first times;

determining, using the at least one processor, at least one of one or more optimal future direct or one or more of indirect energy storage upgrades and one or more energy generation upgrades for implementation at the at least one wastewater treatment facility in accordance with the determined one or more times; and controlling, using the at least one processor, operation of the at least one wastewater treatment facility using the determined one or more first times.

14. A computer implemented method, comprising:

processing, using at least one processor, one or more measurements received from one or more sensors of at least one wastewater treatment facility communicatively coupled to the at least one processor, and storing the processed one or more measurements in at least one storage location;

training, using the at least one processor, at least one model using at least one or more parameters associated with operation of one or more processes of the at least one wastewater treatment facility, the one or more processes being associated with the one or more processed measurements;

determining, using the trained model, the one or more times during which the at least one wastewater treatment facility is configured to at least one of: consume energy for operating of the one or more processes, produce energy operating of the one or more processes, and store energy as a result of operating of the one or more processes;

determining, using the at least one processor, at least one of one or more optimal future direct or one or more of indirect energy storage upgrades and one or more energy generation upgrades for implementation at the at least one wastewater treatment facility in accordance with the determined one or more times; and managing, using the at least one processor, operation of the one or more processes of at least one wastewater treatment facility based on the determined one or more times.

15. The method according to claim 14, wherein the managing includes upgrading operation of the one or processes of the at least one wastewater treatment facility.

16. The method according to claim 14, wherein the managing includes controlling operation of the one or processes of the at least one wastewater treatment facility.

17. The method according to claim 14, wherein the determining of the at least one of one or more optimal future direct or one or more optimal indirect energy storage upgrades and the one or more energy generation upgrades includes selecting one or more design parameters of one or more new energy generation and storage equipment, the one or more design parameters including at least one of the following: at least one of an energy storage or a power capacity of a battery, a power generation capacity of a solar photovoltaic array, a power generation capacity of a wind turbine, a power generation capacity of a combined heat and power unit, a power generation capacity of a microbial battery, a power generation capacity of a biogas fuel cell, a volume of an anaerobic digester, a treatment capacity of a biogas dewatering unit, a treatment capacity of a biogas upgrading unit, a volume and type of a biogas storage tank at standard temperature and pressure, a volume of a compressed oxygen storage tank, a volume of a biosolids storage tank, a volume of a fats, oils and greases storage tank, a volume of a food waste storage tank, one or more specifications of a pump for pumping at least one of biosolids, fats, oils, and greases, and food waste into and out of the biosolids storage tank or fats, oils and greases and food waste storage tank, at least one of a volume or a material composition of wastewater storage tank, one or more specifications of a pump for pumping wastewater into and out of the wastewater storage tank, one or more specifications of a mixer for mixing wastewater stored in a wastewater storage tank, and any combination thereof.

18. A system comprising:

at least one programmable processor; and a non-transitory machine-readable medium storing instructions that, when executed by the at least one programmable processor, cause the at least one programmable processor to perform operations comprising:

processing, using at least one processor, one or more measurements received from one or more sensors of at least one wastewater treatment facility communicatively coupled to the at least one processor, and storing the processed one or more measurements in at least one storage location;

training, using the at least one processor, at least one model using at least one or more parameters associated with operation of one or more processes of the at least one wastewater treatment facility, the one or more processes being associated with the one or more processed measurements;

determining, using the trained model, the one or more times during which the at least one wastewater treatment facility is configured to at least one of: consume energy for operating of the one or more processes, produce energy for operating the one or more processes, and store energy as a result of operating of the one or more processes;

determining, using the at least one processor, at least one of one or more optimal future direct or one or more of indirect energy storage upgrades and one or more energy generation upgrades for implementation at the at least one wastewater treatment facility in accordance with the determined one or more times; and managing, using the at least one processor, operation of the one or more processes of at least one wastewater treatment facility based on the determining.

19. A computer program product comprising a non-transitory machine-readable medium storing instructions that, when executed by at least one programmable processor, cause the at least one programmable processor to perform operations comprising:

processing, using at least one processor, one or more measurements received from one or more sensors of at least one wastewater treatment facility communicatively coupled to the at least one processor, and storing the processed one or more measurements in at least one storage location;

training, using the at least one processor, at least one model using at least one or more parameters associated with operation of one or more processes of the at least one wastewater treatment facility, the one or more processes being associated with the one or more processed measurements;

determining, using the trained model, the one or more times during which the at least one wastewater treatment facility is configured to at least one of: consume energy for operating of the one or more processes, produce energy for operating of the one or more processes, and store energy as a result of operating of the one or more processes;

determining, using the at least one processor, at least one of one or more optimal future direct or one or more of indirect enerqy storaqe upqrades and one or more enerqy qeneration upqrades for implementation at the at least one wastewater treatment facility in accordance with the determined one or more times; and managing, using the at least one processor, operation of the one or more processes of at least one wastewater treatment facility based on the determining.

* * * * *